(12) United States Patent
Wu

(10) Patent No.: US 9,660,538 B2
(45) Date of Patent: May 23, 2017

(54) DIGITAL CLOSED-LOOP CONTROL FOR DC/DC SWITCH-MODE POWER CONVERTERS WITH MULTIPLE OUTPUTS

(71) Applicant: Switching Power, Inc., Ronkonkoma, NY (US)

(72) Inventor: Keng C. Wu, Cranbury, NJ (US)

(73) Assignee: SWITCHING POWER, INC., Ronkonkoma, NY (US)

(*) Notice: Subject to any disclaimer, the term of this patent is extended or adjusted under 35 U.S.C. 154(b) by 0 days.

(21) Appl. No.: 14/705,544

(22) Filed: May 6, 2015

(65) Prior Publication Data
US 2016/0329813 A1    Nov. 10, 2016

(51) Int. Cl.
*H02M 3/335* (2006.01)
*H02M 3/157* (2006.01)

(52) U.S. Cl.
CPC .............................. *H02M 3/33507* (2013.01)

(58) Field of Classification Search
CPC ............. H02M 3/157; H02M 3/33515; H02M 2001/0012; H02M 3/335
USPC ............. 323/283; 363/21.05, 21.13
See application file for complete search history.

(56) References Cited

U.S. PATENT DOCUMENTS

| | | | |
|---|---|---|---|
| 4,899,365 A * | 2/1990 | Hove | H04B 3/145 333/18 |
| 5,814,903 A | 9/1998 | Wu | |
| 6,204,650 B1 * | 3/2001 | Shimamori | H02M 3/157 323/267 |
| 6,285,234 B1 | 9/2001 | Wu | |
| 6,606,257 B2 | 8/2003 | Bourdillon | |
| 6,894,910 B1 | 5/2005 | Wu | |
| 6,903,946 B1 | 6/2005 | Wu | |
| 7,023,716 B1 | 4/2006 | Wu | |
| 7,038,924 B2 | 5/2006 | Wu | |
| 7,301,488 B2 * | 11/2007 | Leung | H03K 7/08 323/223 |
| 7,395,290 B2 * | 7/2008 | Moore | H03H 17/04 708/300 |
| 7,483,798 B2 | 1/2009 | Wu | |
| 7,773,016 B2 * | 8/2010 | Miao | H02M 3/157 323/282 |
| 7,847,532 B2 * | 12/2010 | Potter | G06F 1/26 307/18 |
| 7,969,756 B1 | 6/2011 | Wu | |
| 8,373,402 B2 * | 2/2013 | Peng | H02M 3/157 323/283 |
| 8,749,213 B2 * | 6/2014 | Chen | H02M 3/1584 323/267 |

* cited by examiner

*Primary Examiner* — Gary L Laxton
(74) *Attorney, Agent, or Firm* — Scully, Scott, Murphy & Presser, P.C.

(57) ABSTRACT

Apparatus and method for providing closed loop feedback control for switch-mode DC/DC power converter with multiple outputs using digital filter feedback, in contrast to analog error feedback. In the apparatus and method, multiple outputs for a switch-mode DC/DC power converter are regulated by digital means, including the allocating or partitioning of digital control resources among each of the multiple outputs. The partitioning of control resources may be in response to operating conditions.

19 Claims, 15 Drawing Sheets

DIGITAL CLOSED-LOOP CONTROL FOR DC/DC SWITCH-MODE POWER CONVERTERS WITH MULTIPLE OUTPUTS

FIELD OF THE INVENTION

The present invention relates to regulated DC power supplies generally, and specifically, an improved system and method for providing closed loop digital filter feedback control for DC switch-mode multiple output DC power supplies.

BACKGROUND

Embodiments of most existing switch-mode DC/DC power converters with analog feedback control take the form as shown in FIG. 1 which depicts an existing DC/DC power converter 10 having dual (two) outputs. In the power converter 10 fluctuating, irregular input voltage feeds 12 the input filter 15 that serves to block switching noise from returning to the input port. With the power switch(es) 20 turned ON/OFF by the controlled switch driver(s) 25, a transformer/inductor device 30 passes the input voltage on the primary side to the secondary in unidirectional pulsating form after processing at respective rectifier blocks 35A, 35B. The output filters 40A, 40B extract the direct-current (DC) component from the respective pulsating source and feeds it to a respective output load 45A, 45B. A fraction of the DC output voltage is taken as a signal 48 that is fedback to an analog error amplifier 50 with a very high gain (amplification). By referencing the feedback 48 to a command reference 55, an error signal, 60, which is an indication of how much the output deviates from the desired target, is generated. The error signal 60, a DC voltage, is compared against a built-in oscillating reference carrier (not shown) embedded in a PWM (Pulse Width Modulator) device 65. The action of comparing the two signals produces a rectangular waveform 75 with variable width that drives the power switch(es) ON/OFF ratio of switch drivers 25 until the output(s) are within an acceptable, specified level.

However, as can be seen in the device 10 of FIG. 1 having two outputs, only a single feedback loop exists to perform the closed-loop regulation. In that case, very often the single loop closing is assigned to the one output load with the heaviest load (current). As a result, the other output is left at the mercy of component tolerance, operating conditions, and is poorly regulated.

Provisions may be made to add a local series regulator 41 to the second output filter 40A, such as shown in the modified switch-mode DC/DC converter device 10' having two outputs of FIG. 2, which tends to therefore make that output also regulated. This practice however, adds hardware weight, size, and, the most undesirable, higher cost.

FIG. 3 shows a further modified switch-mode DC/DC converter device 10" having two outputs with alternating, switched feedback. In this design, a fraction of the DC output voltage at the second output filter 40A is taken as an additional signal 49 that is fedback to a second analog error amplifier 51 with a very high gain (amplification). By referencing the further feedback 49 to a further command reference 56, a second error signal, 61, which is an indication of how much the output of the second load deviates from the desired target, is generated. Each error signal 60 and 61, a DC voltage, are switched using Double-Throw, Single Pole (DTSP) switching device 63, for input to the PWM element 65 for comparison against the built-in oscillating reference carrier (not shown) embedded in the PWM device 65. The action of comparing the two signals produces the rectangular waveform 75 with variable width that drives the power switch(es) ON/OFF ratio of switch drivers 25 until both output(s) are within an acceptable, specified level.

This design of FIG. 3 nevertheless will not work since both analog error amplifiers consist of passive resistors (R) and capacitors (C) network. RC networks when switched take time to settle because capacitors tend to retain charge. The settling process in effect introduces transient disturbance and causes output spiking. This is therefore not a solution either.

It would be highly desirable to provide an improved regulated DC/DC switch-mode power supply with multiple outputs.

SUMMARY

There is provided an improved switch-mode DC/DC power flyback converter with improved ability to regulate multiple outputs. and particularly, to perform multiple outputs regulation with digital means.

There is provided an improved switch-mode DC/DC power flyback converter with improved ability to regulate multiple outputs with minimized hardware weight, size, and cost.

There is further provided an improved switch-mode DC/DC power flyback converter with improved ability to allocate control resources among multiple outputs.

There is further provided an improved switch-mode DC/DC power flyback converter with an ability to ration control resources among multiple outputs in responding to an operating condition.

In one aspect, there is provided a switch-mode DC/DC power flyback converter and method of operating. The power converter comprises: a power transformer receiving a source of DC power, and providing a regulated power output to both a first output load and a second output load; a first feedback loop associated with the first output load for regulating the power supplied to the first output load, and a second feedback loop associated with the second output load for regulating the power supplied to the second output load; a first digital filter for processing a first feedback signal corresponding to the first output load in the first feedback loop and generating a first error signal; a second digital filter for processing a second feedback signal corresponding to the second output load in the second feedback loop and generating a second error signal; a switching device for conducting the first error signal generated from the first digital filter as an output at first time intervals, and conducting the second error signal generated from the second digital filter as an output at second time intervals; means responsive to the first output error signal for regulating the first output load at the first time intervals, and responsive to the second output error signal for regulating the second output load at the second time intervals.

In a further aspect, the switch-mode DC/DC power flyback converter comprises: a power transformer receiving a source of DC power, and providing a regulated power output to both a first output load and a second output load; a first feedback loop associated with the first output load for regulating the power supplied to the first output load, and a second feedback loop associated with the second output load for regulating the power supplied to the second output load; a first digital filter for processing a first feedback signal corresponding to the first output load in the first feedback loop and generating a first error signal; a second digital filter for processing a second feedback signal corresponding to the second output load in the second feedback loop and generating a second error signal; the single controller device being configurable as the first digital filter for the first feedback loop and the second digital filter for a second feedback loop, the single controller device receiving a first set of coefficients to configure a direct form implementation of a first discrete digital filter during a first time interval and successive first time intervals, and the single controller device receiving a second set of coefficients to configure a direct form implementation of a discrete second digital filter during the second time interval and successive second time intervals; the controller device generating a first error signal output when configured as the first digital filter at first time intervals, and generating a second error signal output when configured as the second digital filter at the second time intervals; and means responsive to the first output error signal for regulating the first output load at the first time intervals, and responsive to the second output error signal for regulating the second output load at the second time intervals.

Further, methods of operating the DC/DC power flyback converter are provided. In one aspect, a method for regulating a power supply output of a switch-mode DC/DC power converter comprises: receiving, at a power transformer of the switch-mode DC/DC power converter, a source of DC power, the power transformer converting the DC power source to a respective regulated power output at both a first output load and a second output load; receiving, at a first digital filter device in a first feedback loop associated with the first output load, a first feedback signal; and receiving, at a second digital filter device in a second feedback loop associated with the second output load, a second feedback signal; generating, at an output of the first digital filter, a first error signal based on the received first feedback signal; and generating, at an output of the second digital filter, a second error signal based on the received second feedback signal; conducting, using a switching device, the first error signal generated from the first digital filter as an output at first time intervals; and conducting, using the switching device, the second error signal generated from the second digital filter as an output at second time intervals; regulating, responsive to the first output error signal, the first output load at the first time intervals; and regulating, responsive to the second output error signal, the second output load at the second time intervals.

In a further aspect, a method for regulating a power supply output of a switch-mode DC/DC power converter comprises: receiving, at a power transformer of the switch-mode DC/DC power converter, a source of DC power, the power transformer converting the DC power source to a respective regulated power output at both a first output load and a second output load; configuring a controller device as a first digital filter in a first feedback loop in a first time interval and configuring the controller device as a second digital filter for a second feedback loop in a second time interval, receiving, at a controller device, a first set of coefficients to configure a direct form implementation of a first discrete digital filter during a first time interval and successive first time intervals, and receiving at the controller device a second set of coefficients to configure a direct form implementation of a discrete second digital filter during the second time interval and successive second time intervals; the controller device generating a first error signal output when configured as the first digital filter at first time intervals, and generating a second error signal output when configured as the second digital filter at the second time intervals; and regulating, responsive to the first output error signal, the first output load at the first time intervals, and regulating, responsive to the second output error signal, the second output load at the second time intervals.

BRIEF DESCRIPTION OF THE SEVERAL VIEWS OF THE DRAWINGS

Other aspects, features and advantages of the present invention will become more fully apparent from the following detailed description, the appended claims, and the accompanying drawings in which similar elements are given similar reference numerals.

DETAILED DESCRIPTION

Figure 1:
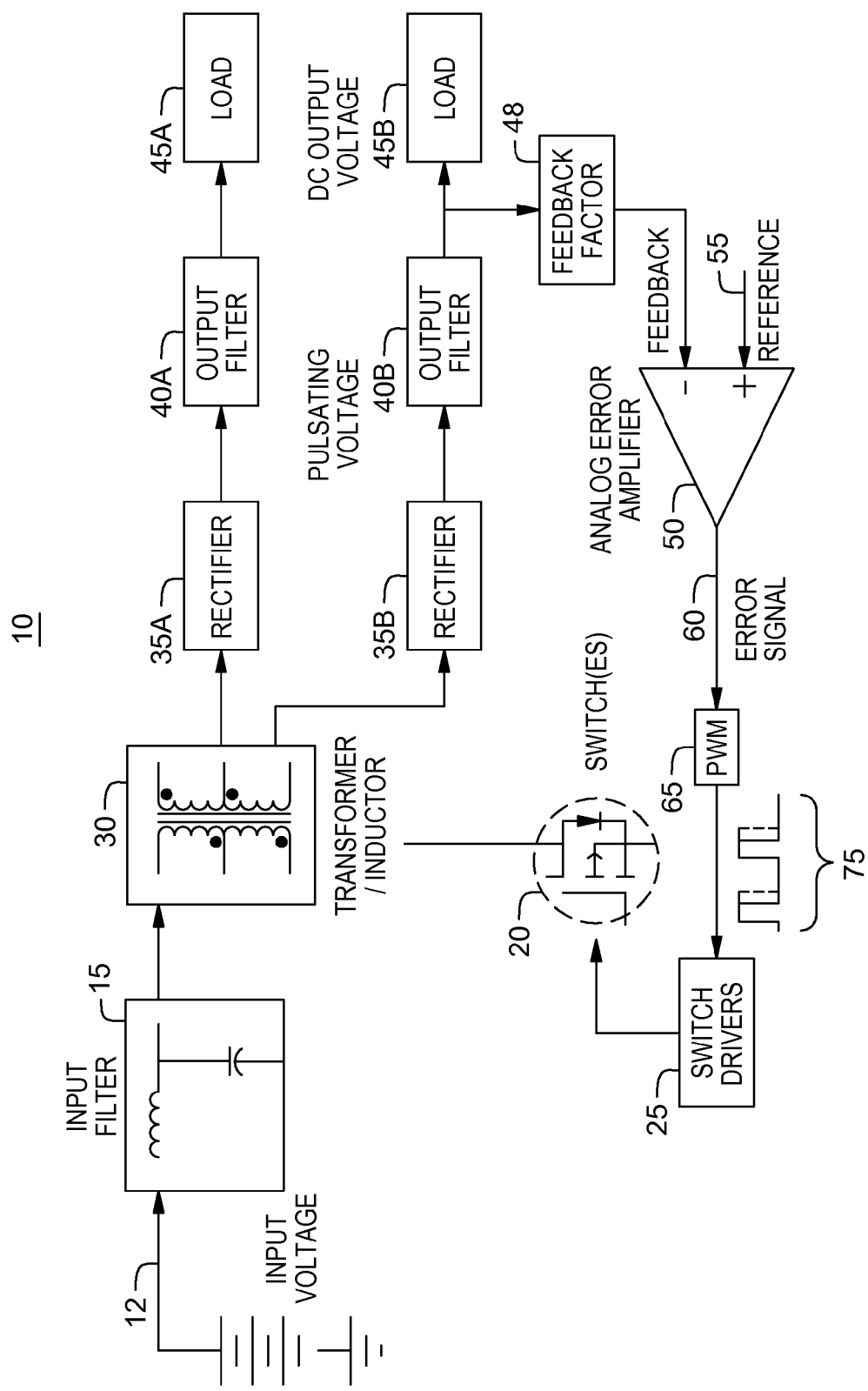
FIG. 1 shows a block diagram of an example prior art switch-mode DC/DC power flyback converter with analog feedback for a two-output load.
Figure 2:
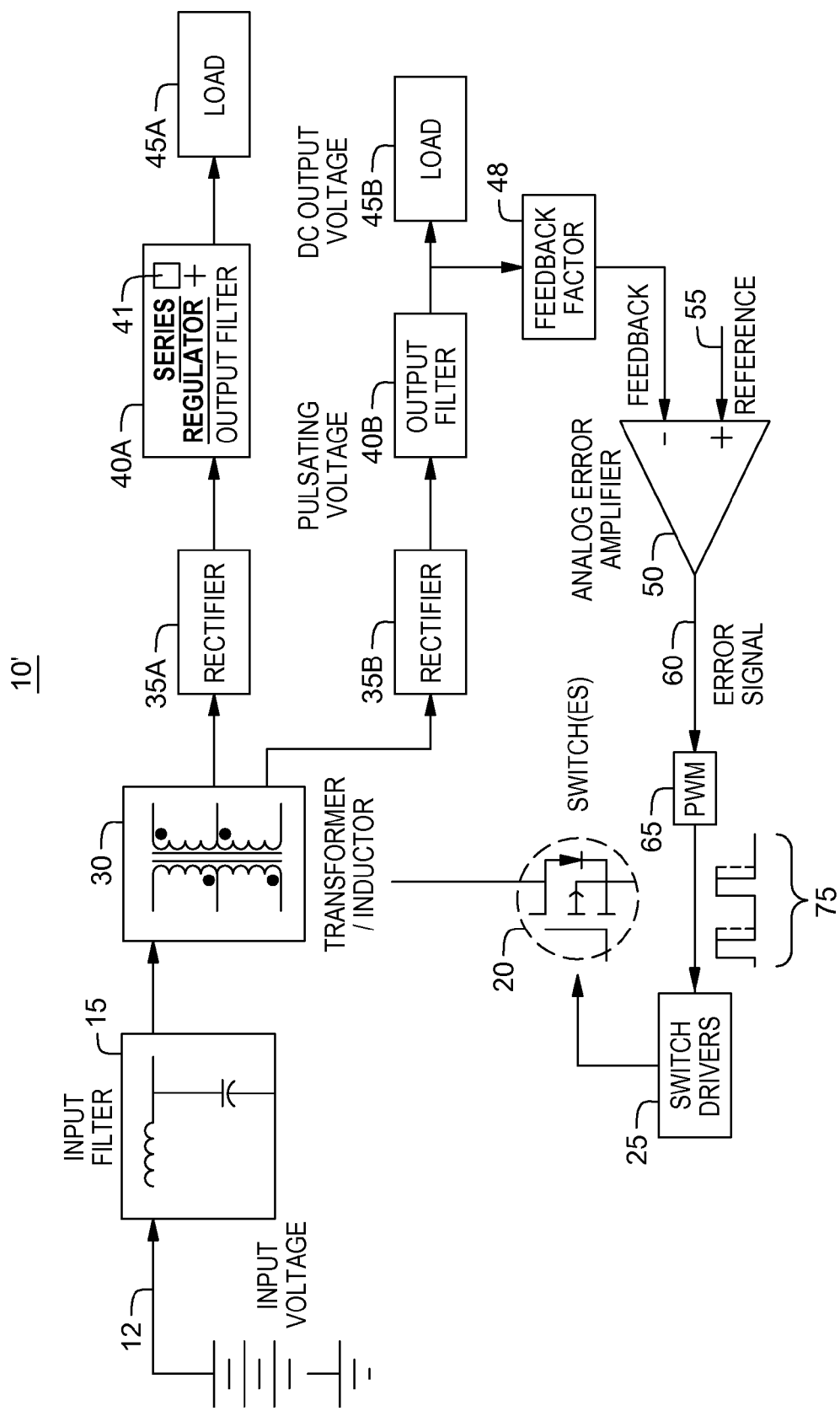
FIG. 2 shows a block diagram of a prior art switch-mode DC/DC power flyback converter with analog feedback for a two-output load and an additional series regulator at a second output.
Figure 3:
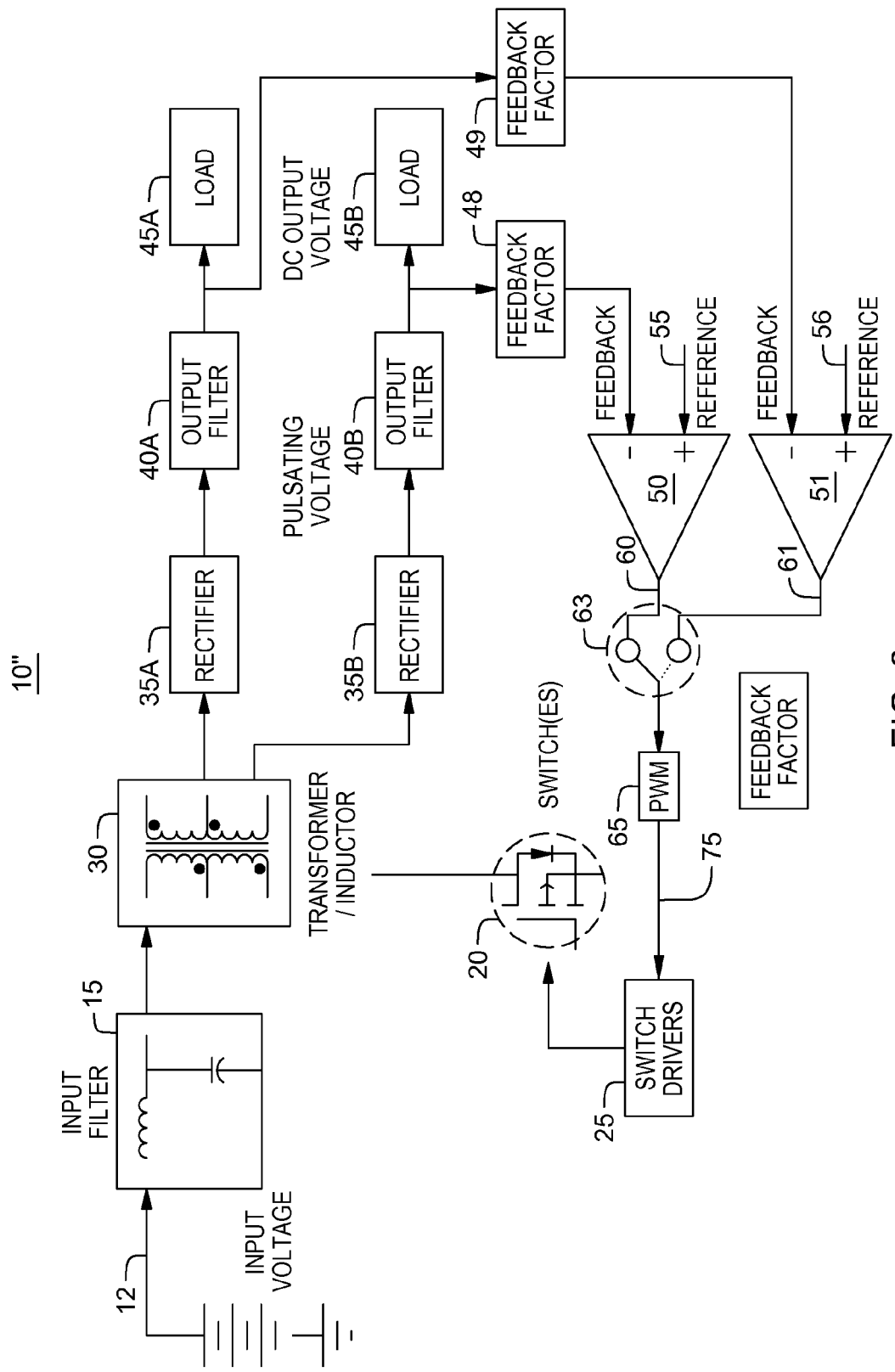
FIG. 3 shows a block diagram of a switch-mode DC/DC flyback power converter with two outputs and two alternating analog feedback loops implementing an analog filter in each.
Figure 4:
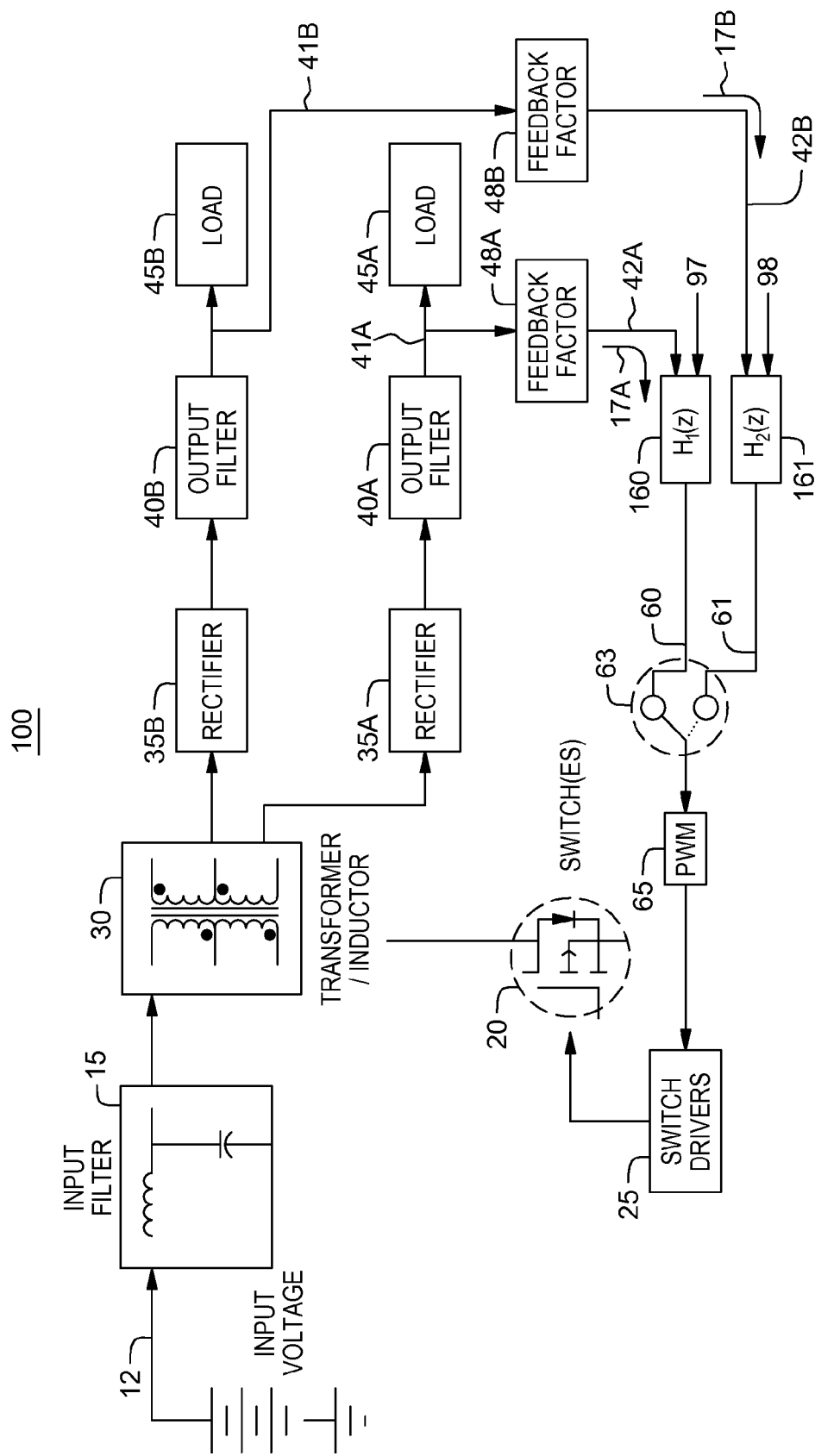
FIG. 4 shows a block diagram of a switch-mode DC/DC flyback power converter with two outputs and two alternating digital feedback loops implementing digital filter in each.

FIG. 4 illustrates a block schematic diagram of a switching mode DC/DC power flyback converter 100 providing output power to two output loads, and implementing two alternating digital feedback loops 17A, 17B according to a first embodiment of the invention.

In the DC/DC converter of FIG. 4, first feedback loop 17A provides DC power through rectifier 35A and output filter 40A elements to a first output load 45A. A feedback signal 41A from the output filter 40A is input to feedback factor element 48A providing a scaled-down feedback signal 42A to first digital filter 160. Scaling is necessary to bring down the output signal level for digital processing by the digital filter. As will be described, in one embodiment, digital filter 160 comprises an analog/digital converter element, a reference signal, and discrete digital filter having a transfer function $H_1(z)$. The discrete digital filter output, i.e., the error signal 60 from the digital filter 160, is coupled to one input of "single-pole double throw" (SPDT) electronic switch 63.

Likewise, a second feedback loop 17B provides DC power through rectifier 35B and output filter 40B elements to a second output load 45B. A feedback signal 41B from the output filter 40B is input to feedback factor element 48B providing a scaled-down feedback signal 42B to a second digital filter 161. Scaling is necessary to bring down the output signal level for digital processing by the digital filter. In one embodiment, digital filter 161 comprises an analog/digital converter element, and a reference signal. This discrete digital filter is configured to have a different transfer function, e.g., $H_2(z)$. The discrete digital filter output, i.e., the error signal 61 from the digital filter 161, is coupled to a second input of the SPDT switch 63. Output of the switch 63 is coupled to the PWM element 65 the output of which controls switch drivers 25 and hence transformer/inductor control under digital control.

Figure 5A:
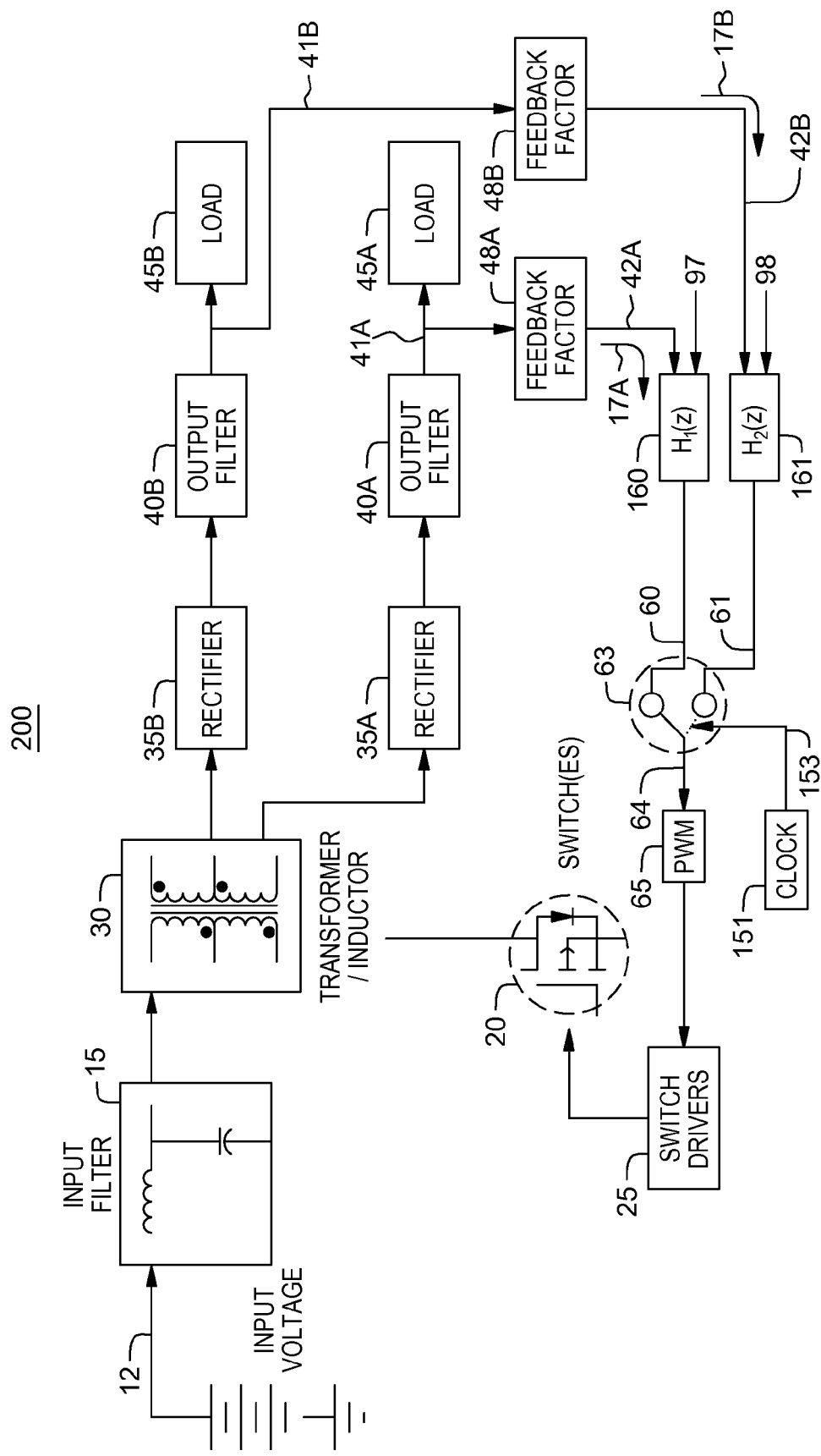
FIG. 5A shows a block diagram of a switch-mode DC/DC flyback power converter with two outputs and two alternating digital feedback loops implementing digital filter in each and partitioned proportionally according to a further embodiment.

FIG. 5A illustrates a block schematic diagram of a switching mode DC/DC power flyback converter 200 according to a further embodiment of the invention, having two outputs and two alternating digital feedbacks as controlled by switch element 63 as in FIG. 4, however, in the embodiment of the converter 200 depicted, the SPDT digital error signal switch 63 that receives the error signal 60, 61 from each digital filter is timed by a control device such as a clock element 151 which may be an adjustable duty cycle clock signal generator. Clock signal generator 151 is programmed to generate clock signals 153 for controlling a temporal partitioning, i.e., a dwell time of the SPDT switch that follows the digital filter. That is, element 151 generates dwell time switch signals 153 for timing the temporal rationing of the SPDT. By generating the control signals for controlling the dwell time of the SPDT switch, regulation quality for each individual output may be tailored according to requirements. For example, under clock timing control, the power converter 200 for two outputs employs two alternating digital feedback controls partitioned proportionally. The switch output signal 64 thus comprises a periodic alternating first error signal, e.g., signal 60, from first digital filter 160 at first and successive first switched time intervals thereafter, and a second error signal, e.g., signal 61, from the second digital filter 161 at second and successive second switched time intervals.

Thus, FIG. 5A shows both digital filters incorporated in the converter feedback loop with the PWM's control feed (input) alternating between the two digital filters' outputs 60, 61. An adjustable duty cycle clock signal generator 151 manages the alternation rate and dwell ratio to the point that gives both outputs more acceptable regulation than what a static single loop can offer.

Both the DC/DC power converter 100 of FIG. 4 and the converter 200 in the embodiment depicted in FIG. 5A show the replacement of both analog amplifiers of the prior art embodiment with equivalent digital filters, 160, 161, with each digital filter generally expressed as including a discrete z-transform H(z), analog-to-digital converter, and digital reference.

In one embodiment, each digital filter 160, 161 is implemented as a respective individual programmable hardware device, such as a single microprocessor (having its own associated I/O, memory and registers), or a microcontroller, or a field-programmable gate array (FPGA), all referred to hereinafter as a "controller device". In a further embodiment, a single controller device may be programmed to be configured as a respective digital filter 160, 161 in alternating time intervals.

Figure 5B:
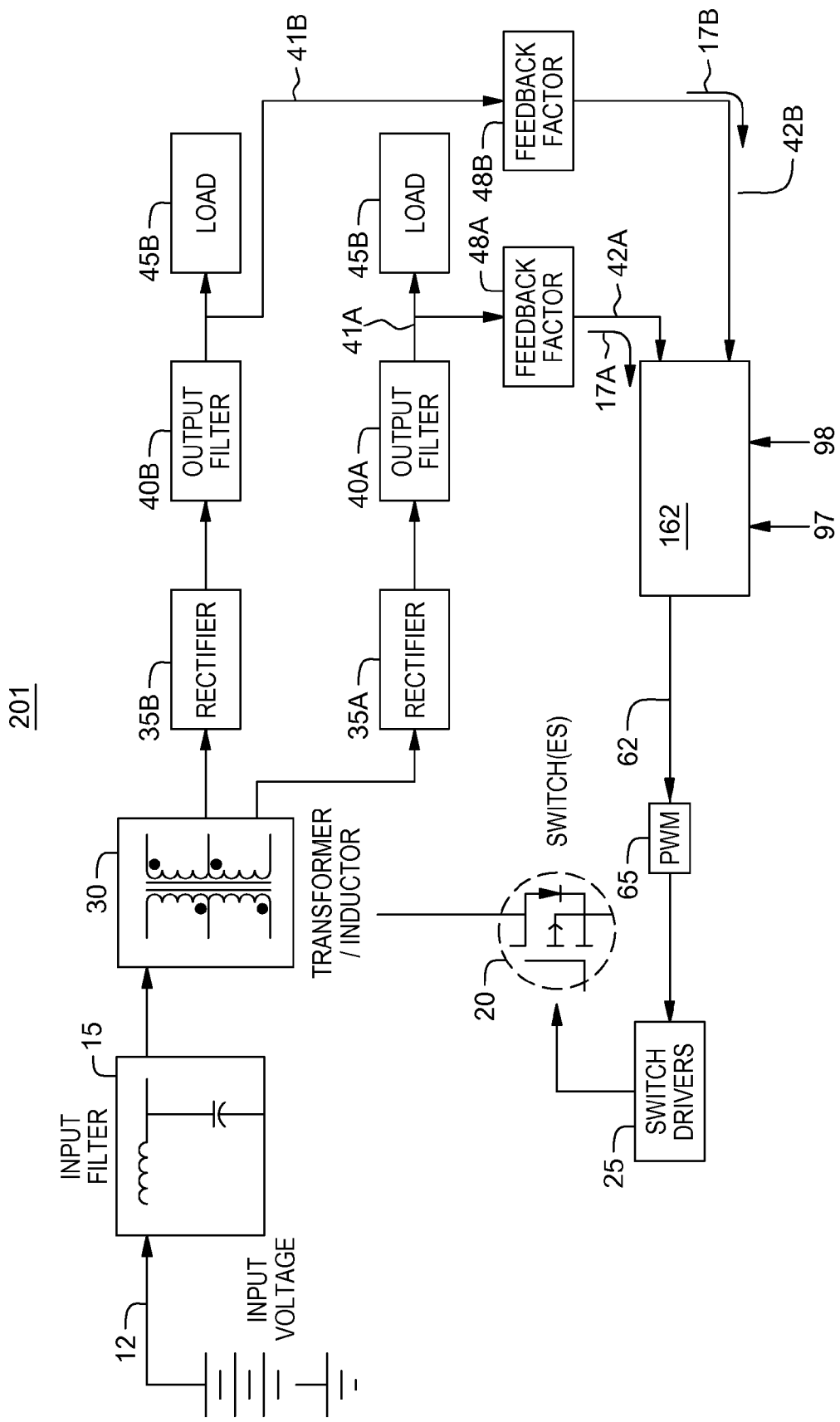
FIG. 5B shows a block diagram of a switch-mode DC/DC flyback power converter with two outputs and two alternating digital feedback loops implementing a single controller device configurable with alternating sets of coefficients for alternating configuration between two digital filters (partitioned proportionally) according to a further embodiment.

FIG. 5B thus illustrates a further alternative embodiment of the switching mode DC/DC power flyback converter 201 corresponding to the embodiment of FIG. 5A. In the DC/DC converter 201 of FIG. 5B, both digital filters 160, 161 are implemented by a single controller device, e.g., a single FPGA. That is, the programmable duty cycle clock signal generator 151 for controlling the adjustable dwell time and alternation rate for conducting and processing respective digital filter outputs 60, 61 in the embodiment of FIG. 5A, is replaced with a single programmed controller device 162 that is programmed to alternately process signals 42A, 42B from respective feedback loops, 17A, 17B, at the partitioned period and dwell time rate. During each alternate process, the single controller device 162 will input and process a corresponding set of coefficients and alternately configure the controller device 162 as a respective digital filter 160, 161 for each feedback loop for the desired dwell time and alternation rate. In effect, rather than switching by external clock control and switch elements, the single controller device is alternately switched to configure itself as either the discrete digital filter 160 or the discrete digital filter 161 of the first embodiment at alternating time intervals. In the embodiment depicted in FIG. 5B, and as described in further detail below, the alternation is performed at the coefficient level by switching between the two sets of filter coefficients at the dwell time rate and period.

Figure 6A:
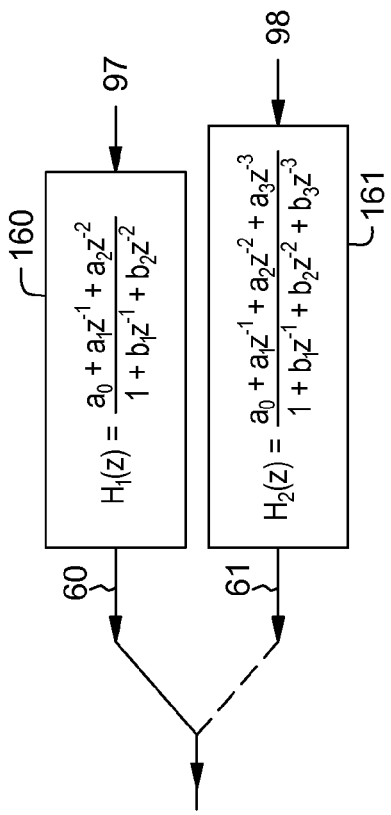
FIGS. 6A-6D depict various example embodiments of a digital filter design implemented in the switch-mode DC/DC flyback power converter embodiments of FIGS. 4, 5A-5B.

FIG. 6A depicts generally the programming of each respective controller device as a respective digital filter 160, 161 for each respective feedback loop. In the first embodiment of FIG. 6A, to configure a controller device as digital filter 160, the controller device receives a respective first set of coefficients 97, e.g., coefficients $a_0, \ldots b_2$, and stores their values at respective registers or memory devices for use in programming a first discrete digital filter transfer function $H_1(z)$. In this embodiment depicted the first discrete digital filter transfer function $H_1(z)$ is of a quadratic form. Likewise, to configure a controller device as digital filter 161, the controller device receives a respective second set of coefficients 98, e.g., coefficients $a_0, \ldots b_2$, and stores their values at respective registers or memory devices for use in programming a second discrete digital filter transfer function $H_2(z)$.

Figure 6B:
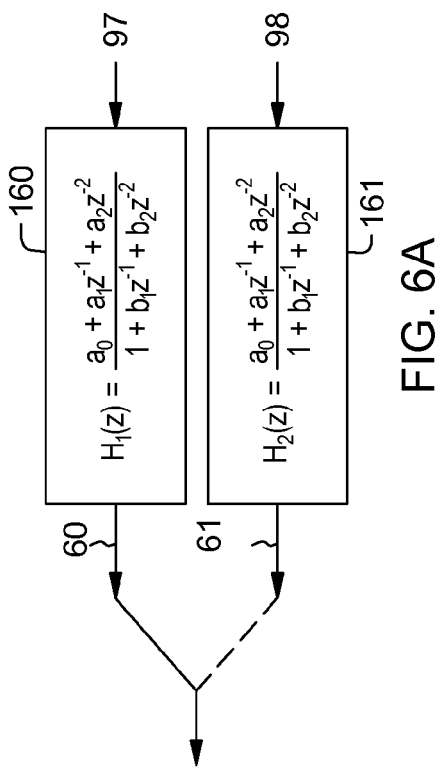

FIG. 6B depicts generally the programming of each respective controller device as a respective digital filter 160, 161 for each respective feedback loop. In the embodiment of FIG. 6B, the controller device may be configured as digital filter 160 of quadratic form by receiving a respective first set of coefficients 97, e.g., coefficients $a_0, \ldots b_2$, and stores their values at respective registers or memory devices for use in programming a first discrete digital filter transfer function $H_1(z)$. However, in this embodiment, the controller device is configured as a digital filter 161 of cubic form, such that the controller device receives a respective second set of coefficients 98, e.g., coefficients $a_0, \ldots b_3$, and stores their values at respective registers or memory devices for use in programming a second discrete digital filter transfer function $H_2(z)$ of cubic form.

Figure 6C:
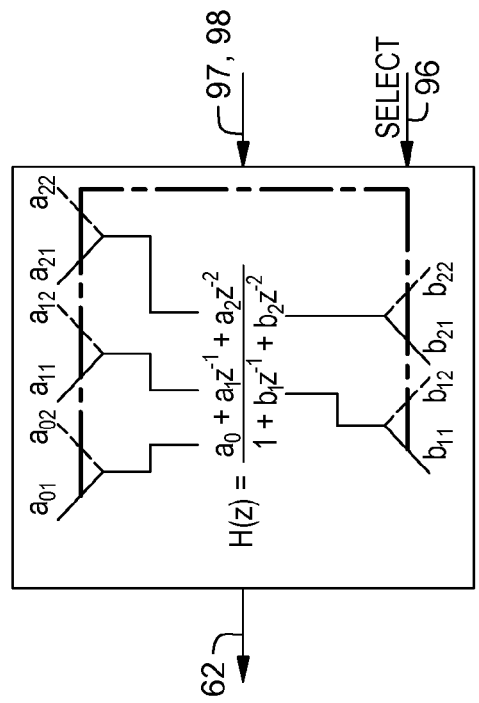

FIG. 6C depicts generally a further alternate embodiment where each control device 160, 161 is configured in cubic form. Thus, in the embodiment of FIG. 6C, the controller device may be configured as digital filter 160 of cubic form by receiving a respective first set of coefficients 97, e.g., coefficients $a_0, \ldots b_3$, and stores their values at respective registers or memory devices for use in programming a first discrete digital filter transfer function $H_1(z)$. The further controller device is configured as a digital filter 161 of cubic form, such that the controller device receives a respective second set of coefficients 98, e.g., coefficients $a_0, \ldots b_3$, and stores their values at respective registers or memory devices for use in programming a second discrete digital filter transfer function $H_2(z)$ of cubic form.

Figure 6D:
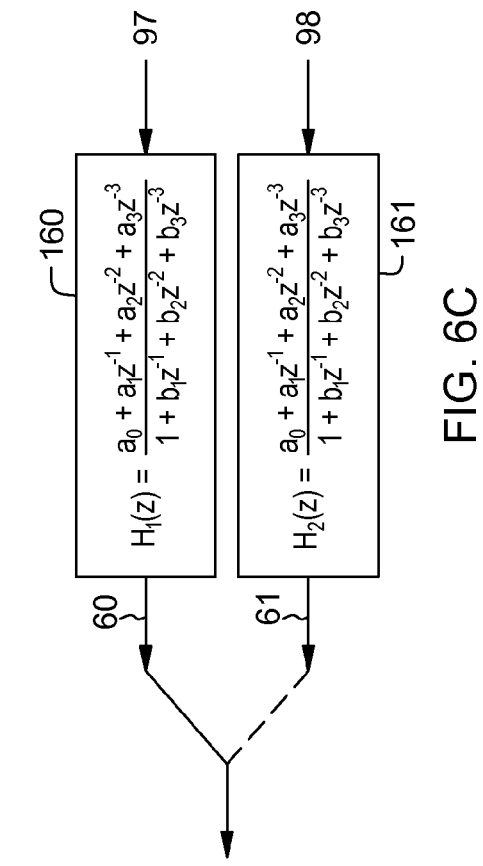

FIG. 6D depicts generally a further alternate embodiment where the single control device 162 is configured as each digital filter 160, 161 at the temporal partitioning rate. As shown, the controller 162 is configured as a generic digital transfer function which may be either quadratic (as depicted) or cubic, or configured as both quadratic and cubic in the alternating intervals. Thus, in the embodiment of FIG. 6D, the controller device 162 may be configured as digital filter 160 of quadratic form by using a respective first set of stored coefficients 97, e.g., coefficient values $a_0, \ldots b_2$, to program the first discrete digital filter transfer function $H_1(z)$ during the first dwell time intervals; and the controller device 162 may be configured as digital filter 161, e.g., of quadratic form by alternately using a second set of stored coefficients 98, e.g., coefficient values $a_0, \ldots b_2$, to program the second discrete digital filter transfer function $H_2(z)$ during at second dwell time intervals. The further controller device is configured as a digital filter 161 of cubic form, such that the controller device receives a respective second set of coefficients 98, e.g., coefficients $a_0, \ldots b_3$, and stores their values at respective registers or memory devices for use in programming a second discrete digital filter transfer function $H_2(z)$ of cubic form. Thus, in the embodiment of FIG. 6D, instead of providing switched filter outputs, the controller device 162 is responsive to an internally generated trigger signal 96 that selects which set of coefficient set, 97, 98 to access and use in order to configure a respective digital filter transfer function $H_1(z)$ or $H_2(z)$ for the rationed time interval.

Thus, in each of the digital filter embodiments, a controller device is programmed to respectively receive a set of values, including digital filter coefficients 97, 98 used to program each respective discrete digital filter 160, 161 for controlling digitally, the switching of the flyback converter outputs. The software representing each filter transfer function may be programmed or "burned" into each respective single controller device to configure the controller to concurrently run two separate processing threads, each thread configured by a separate set of programmed and stored filter coefficients 97, 98 corresponding to each digital filter 160, 161 respectively. Programmable sets of coefficients may be stored into a register or memory location associated with the programmable control device. Additionally, programmable sets of coefficients may be received from another device remotely, e.g., communicated over a network, and stored into the memory associated with the programmable control device. The set of filter coefficients 97, 98 may thus be communicated, received, stored and used to program the response of each digital filter in a user-defined way.

In each of the embodiments of the DC/DC flyback converter described herein, the alternation clock rate/frequency and dwell time of the SPDT switching (or alternately, of the switching of the sets of coefficients configuring each digital-feedback filter) is configurable. Given an embodiment of a DC/DC converter having a main power stage (power train) switched at 20 KHz, which is much higher than the closed-loop bandwidth of only 2 KHz, the SPDT toggling/alternating rate/frequency is set to 100 KHz; five times of the power stage switching. This alternation clock rate/frequency is one minimum required in one embodiment. In further embodiments, this rate may be extended up to 500 KHz.

Generally, the sampling frequency for a digital filter may be selected according to steps such as: examining and plot the corresponding analog error amplifier in frequency domain; picking a frequency that covers sufficiently the performance of the analog error amplifier and selecting a sampling frequency that is at least twice the frequency picked in the prior step.

Figure 11:
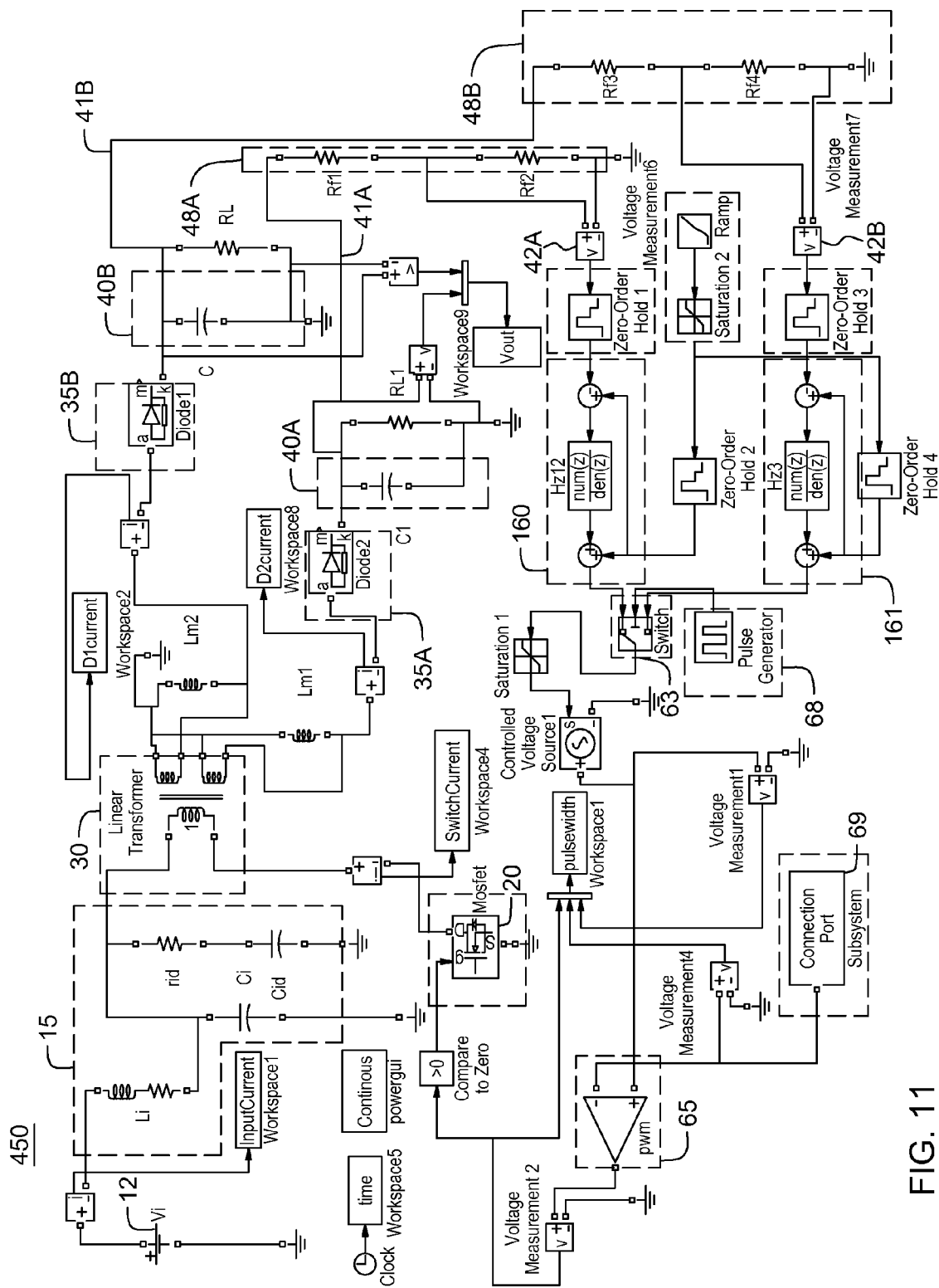
FIG. 11 shows an example simulation 450 showing a DC/DC flyback converter circuit operating under control of two alternating digitally filtered feedback loops.

With respect to the dwell time rationing, given an example operating conditions of input and load such as shown and described herein with respect to FIG. 11, the dwell time ratio per 100 KHz cycle is 45% ($v_1$ loop) to 55% ($v_2$ loop). It is understood, however, this ratio shall not be a fixed constant under fluctuating operating conditions.

Figure 7A:
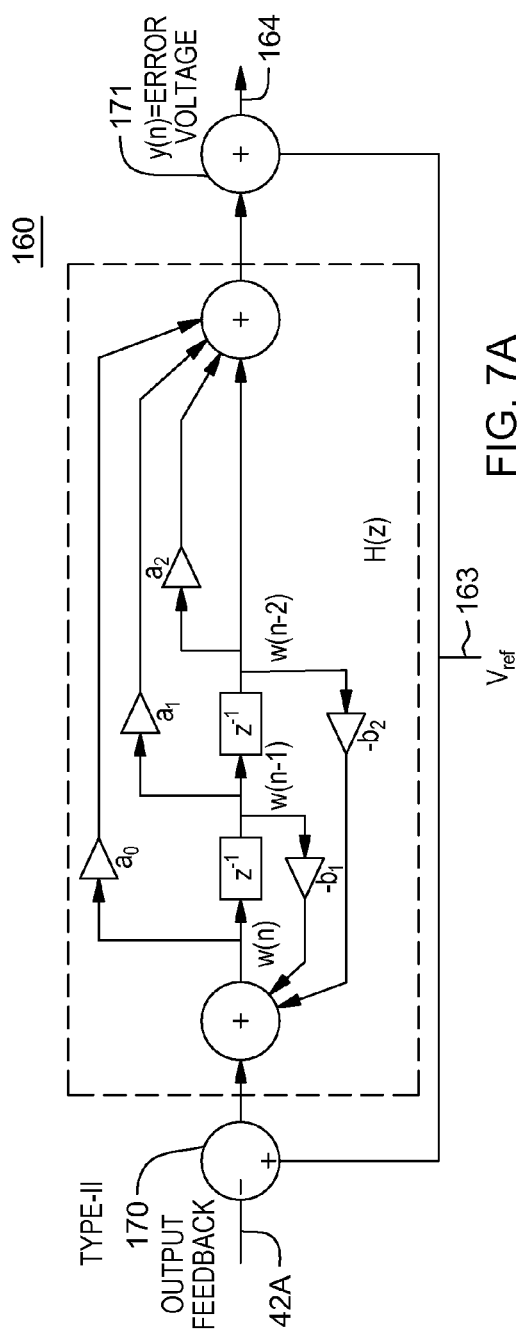
FIG. 7A shows a direct form implementation of a Type-II discrete digital filter in one embodiment.

As mentioned, each digital filter may be embodied as a separate, stand-alone processor or microcontroller (or FPGA) having its own associated memory, I/O and registers, or both discrete digital filters may be embodied as a single controller. Whether embodied as separate standalone controller device or not, as shown in FIG. 7A, in an example embodiment, the discrete digital filter 160 is configured to receive one set of coefficients 97 to program a direct form implementation of a discrete digital filter $H_1(z)$ having a Type-II (quadratic or $2^{nd}$ order denominator) transfer form:

$$H(z) = \frac{a_0 + a_1 z^{-1} + a_2 z^{-2}}{1 + b_1 z^{-1} + b_2 z^{-2}}$$

where polynomial coefficients $a_n$ and $b_n$, n=0, 1 or 2 are derived from a combination of analogue coefficients of a corresponding error analog amplifier function described in greater detail herein below. One set of coefficients for this filter need to be loaded and stored in the hardware microprocessor, microcontroller, or FPGA.

Figure 7B:
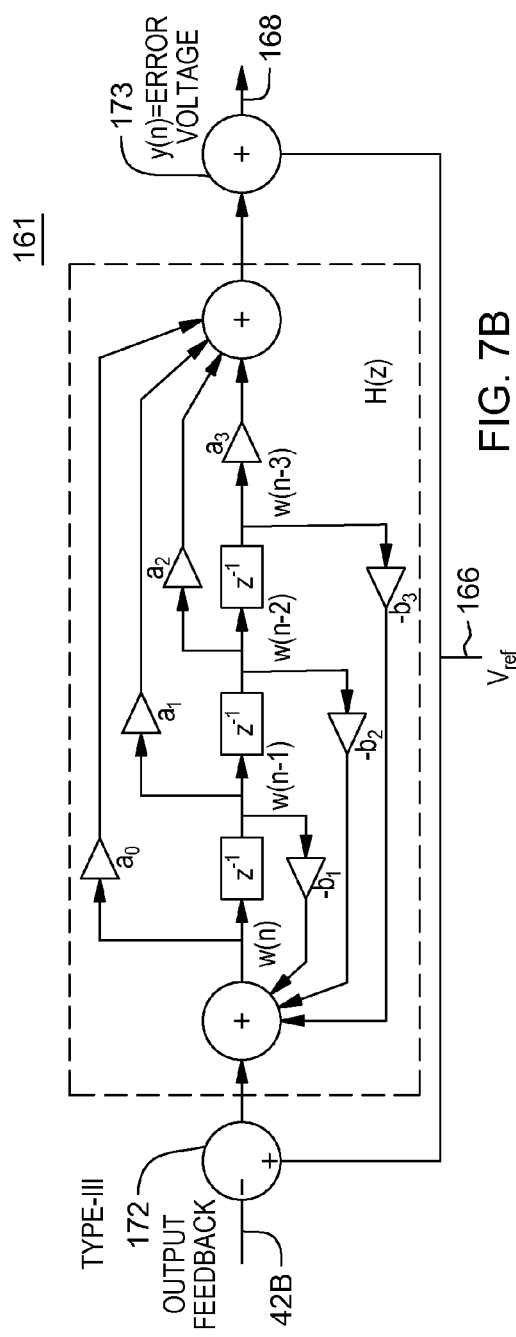
FIG. 7B shows a direct form implementation of a Type-III discrete digital filter in one embodiment.

Similarly, in an example embodiment, as shown in FIG. 7B, digital filter 161 receives the other set of coefficients 98 corresponding to a direct form implementation of discrete digital filter $H_2(z)$, which has a Type-III form (cubic or $3^{rd}$ order denominator) transfer form:

$$H(z) = \frac{a_0 + a_1 z^{-1} + a_2 z^{-2} + a_3 z^{-3}}{1 + b_1 z^{-1} + b_2 z^{-2} + b_3 z^{-3}}$$

where polynomial coefficients $a_n$ and $b_n$, n=0, 1, 2 or 3, are derived from a combination of analogue coefficients of a corresponding error analog amplifier function described in greater detail herein below. One set of coefficients for this filter need to be loaded and stored in the hardware microprocessor, microcontroller, or FPGA.

In either embodiment, the digital filter transfer function H(z) may receive its own set of respective coefficients, Type-II or Type_III coefficients for regulating the outputs. While such a configuration may give better performance; use of two control devices however, is a more costly alternative.

FIG. 7A shows a detailed example Type-II digital transfer function H(z) representing a digital filter 160 in a (digital) z-transform domain in one embodiment. At an input to the digital filter 160 is a sample and hold circuit, i.e., an Analog-to-digital converter element, that receives the continuous feedback factor signal 42A representing the output load (e.g., from feedback loop 17A), and generates discrete time samples of the signal 42A at a pre-determined sampling rate internal to the digital filter. It is these discrete time samples of the signal 42A that are input to the digital filter transfer function depicted by a configuration of discrete type digital circuit elements as shown in FIG. 7A. The digital filter 160 is then programmed to apply the programmed digital filter transfer function H(z) based on the received digital reference signal $V_{ref}$ 163 (i.e., a number in the digital domain), and based on received values of the polynomial coefficients $a_n$ and $b_n$, n=0, 1 or 2 used to configure the filter. In one embodiment, the coefficients $a_n$ and $b_n$ values are derived from a combination of analogue coefficients of a corresponding error analog amplifier function. It is understood that microcontroller or FPGA embodying the digital filter can additionally provide a digital reference voltage (e.g., a number) 163 for filter operation. In one embodiment, digital reference voltage (e.g., a number) 163 is 2.5 Volts, shown as input to a respective summation element 170 and summation element 171 at a respective input and output of the filter 160. Responsive to the digital filter 160 processing output feedback from the feedback factor element associated with the first load, a discrete time filter output error signal y[n] 164 is generated. This error output signal y[n] 164 is input to the SPDT switch that is clocked at specified rate to provide for rationed digital control dwell time intervals as described herein. The variable "n" are the discrete time sampling clock index for the digital filter as generated by a clock (not shown) built-in to the filter.

Likewise, FIG. 7B shows a detailed example Type-III digital transfer function H(z) representing a digital filter 161 in a (digital) z-transform domain. While not shown, at an input to the digital filter 161 is a sample and hold circuit, i.e., an Analog-to-digital converter element, that receives the continuous feedback factor signal 42B representing the output load (e.g., from feedback loop 17B), and generates discrete time samples of the signal 42B at a pre-determined sampling rate internal to the digital filter. It is these discrete time samples of the signal 42B that are input to the digital filter transfer function depicted by a configuration of discrete type digital circuit elements as shown in FIG. 7B. The digital filter 161 is then programmed to apply the programmed digital filter transfer function H(z) based on the received digital reference signal $V_{ref}$ 166 (i.e., a number in the digital domain), and based on received values of the polynomial coefficients $a_n$ and $b_n$, n=0, 1, 2 or 3, used to configure the filter. In one embodiment, the coefficients $a_n$ and $b_n$ values are derived from a combination of analogue coefficients of a corresponding error analog amplifier function. It is understood that microcontroller or FPGA embodying the digital filter can additionally provide a digital reference voltage (e.g., a number) 166 for filter operation. In one embodiment, digital reference voltage (e.g., a number) 166 is 2.5 Volts, shown as input to a respective summation element 172 and summation element 173 at a respective input and outputs of the filter 161. Responsive to the digital filter 161 processing output feedback from the feedback factor element associated with the first load, a discrete time filter output error signal y[n] 168 is generated. This error output signal y[n] 168 is input to the SPDT switch that is clocked at specified rate to provide for rationed digital control dwell time intervals as described herein. The variable "n" are the discrete time sampling clock index for the digital filter as generated by a clock (not shown) built-in to the filter.

With respect to FIGS. 7A and 7B, in one embodiment in which direct form digital filters (in signal flow form) are shown, $a_n$ and $b_n$ coefficients may be stored in FPGA register/memory locations and $z^{-1}$ represents a one clock cycle delay element. Stored also in a memory, $V_{ref}$, represents a reference voltage in digital form. Typical FPGAs have built-in A-D converter that receives in-coming analog feedback signal and converts it into digital words. Digital feedback is subtracted from the digital reference voltage. The difference is processed by numerical multiplication, delay, summing, recirculation, etc., and generated as an output. All operations are performed at a selected clock rate and the combination behaves as a filter.

Figure 8A:
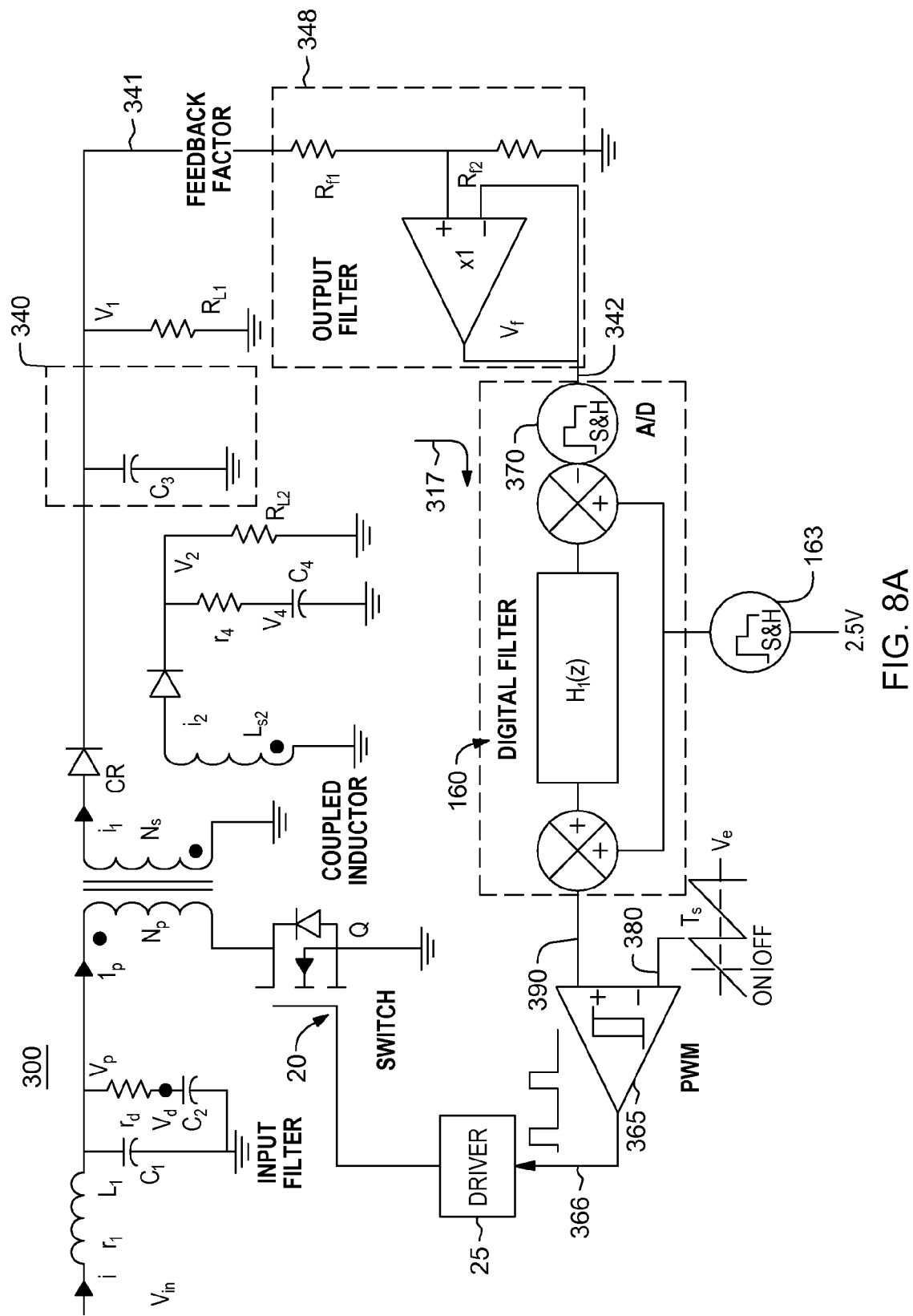
FIG. 8A shows a block diagram of a switch-mode DC/DC power flyback converter with two outputs and a single feedback loop for a first output load regulation and implementing a digital filter of a first quadratic type according to a further embodiment.

In one embodiment, a single digital filter may be configured to provide digital switching control for a flyback converter having two outputs and a single digital filter $H_1(z)$ for controlling one of the multiple outputs (two being shown). FIG. 8A shows one example circuit embodiment of a Flyback converter 300 for providing discrete digital control of a single output load based on a single digital filter, e.g., having transfer function $H_1(z)$. For example, a feedback loop 317 associated with a first output load $R_{L1}$ loop is provided implementing single Type-II digital filter 160. Feedback signal 341 from the output filter elements 340 at the first load output is input to feedback factor 348 which divides the output feedback signal 341 into a scaled down version using a voltage divider network comprising resistor elements $R_{f1}$, $R_{f2}$ and buffer operational amplifier "x1" to provide an input signal 342 suitable for processing by the A/D sampler 370 that provides the discrete sampled feedback signal as input to the single Type-II or Type-III digital filter 160. The PWM element 365 has an external waveform input 380 that enables the output to swing between two values. The PWM 365 receives a first carrier input waveform 380 depicted as a periodic ramp or a sawtooth waveform input at an inverting terminal, the first carrier input waveform 380 having a signal period $T_s$ representing a set period (a frequency) of the power drivers switching clock. The PWM 365 further receives a second input digital filter error signal waveform 390 (e.g., depicted as signal $V_e$) output from the digital filter at the non-inverting terminal.

In operation, the PWM block 365 conducts based on when the error signal $V_e$ is greater in value (rises above) the voltage carrier at the inverting input. Otherwise, the PWM 365 will stop conducting when the error signal decreases (drops below) the carrier level. This provides the pulse width modulation used as an input signal 366 to the switch driver element 25 used to drive the power switch 20 for regulating the output voltage $V_1$ via the feedback loop 317. Thus, in this embodiment, as only feedback $V_1$ from one load is obtained, only one load is regulated by the loop and the $2^{nd}$ load output voltage $V_2$ may be unregulated.

Figure 8B:
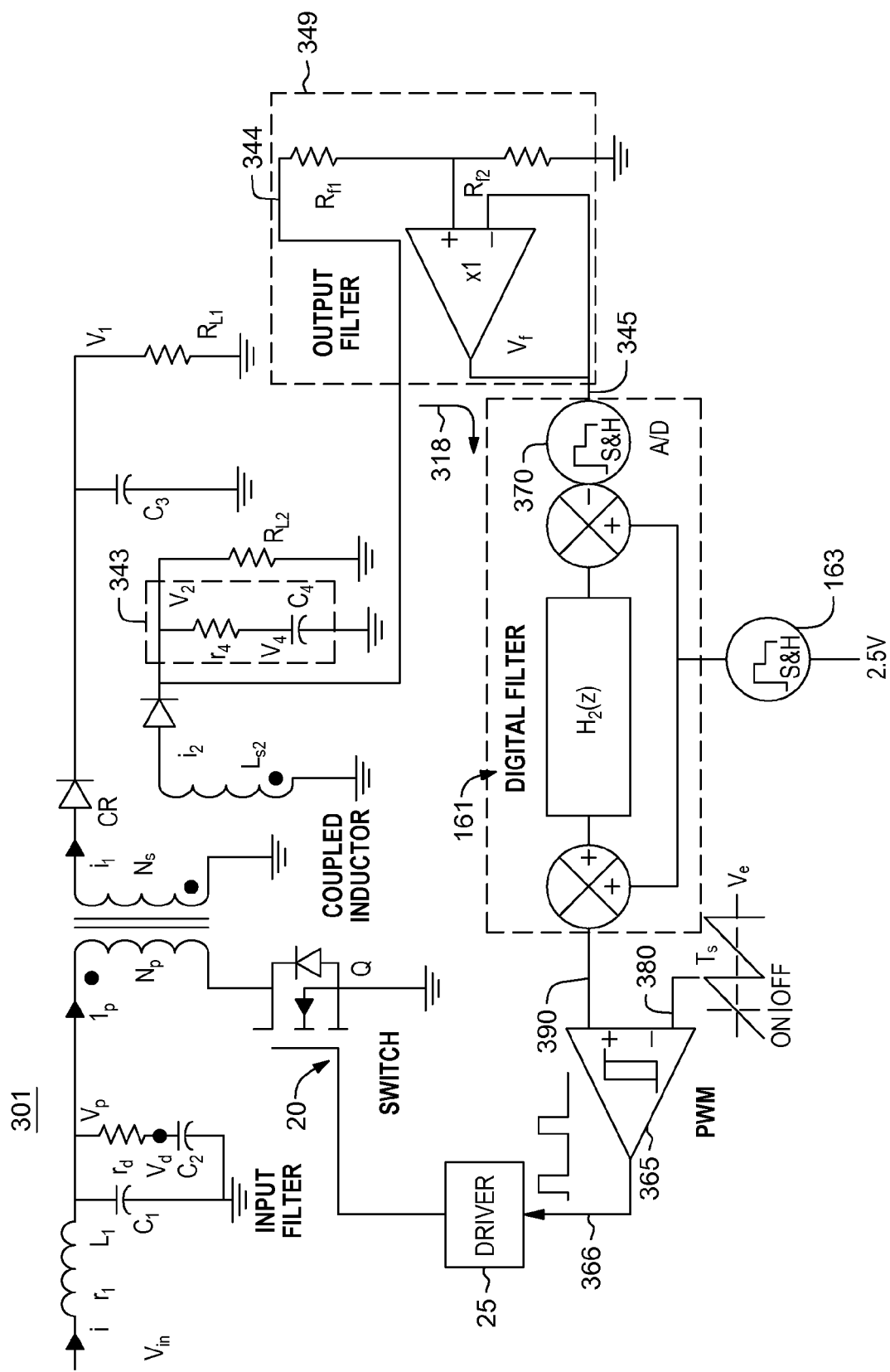
FIG. 8B shows a block diagram of a switch-mode DC/DC power flyback converter with two outputs and a different single feedback loop for a different output load regulation implementing a digital filter of a second type according to a further embodiment.

In a further embodiment, a single digital filter may be configured to provide digital switching control for a flyback converter having two outputs and a single digital filter $H_2(z)$ for controlling one of the outputs. FIG. 8B shows one example circuit embodiment of a Flyback converter 301 for providing discrete digital control of a single output level based on a single digital filter $H_2(z)$. For example, a feedback loop 318 associated with a second output load $R_{L2}$ (of two or multiple output loads) is provided implementing single Type-II, or Type-III, digital filter 161. Feedback signal 344 from the output filter elements 343 at the second load output is input to feedback factor 349 which divides the output feedback signal 345 into a scaled down version using a voltage divider network comprising resistor elements $R_{f1}$, $R_{f2}$ and buffer operational amplifier x1 to provide an input signal 345 suitable for processing by the A/D sampler 370 in the manner as described above that provides the discrete sampled feedback signal as input to the single Type-II or Type-III digital filter 161. The PWM element 365 has an external waveform input 380 that enables the output to swing between two values. The PWM 365 receives a first carrier input waveform 380 depicted as a ramp or a sawtooth waveform input at an inverting terminal, the first carrier input waveform 380 having a signal period $T_s$ representing a set period (a frequency) of the power drivers switching clock. The PWM 365 further receives a second input digital filter error signal waveform 390 (e.g., depicted as signal $V_e$) output from the digital filter at the non-inverting terminal.

In operation, the PWM block 365 conducts based on when the error signal $V_e$ is greater in value (rises above) the voltage carrier at the inverting input. Otherwise, the PWM 365 will stop conducting when the error signal decreases (drops below) the carrier level. This provides the pulse width modulation used as an input signal 366 to the switch driver element 25 used to drive the power switch 20 for regulating the output voltage $V_2$ via the feedback loop 318. Thus, in this embodiment, as only feedback $V_2$ from one load is obtained, only one load is regulated by the loop and the $1^{st}$ load output voltage $V_1$ may be unregulated.

Figure 9:
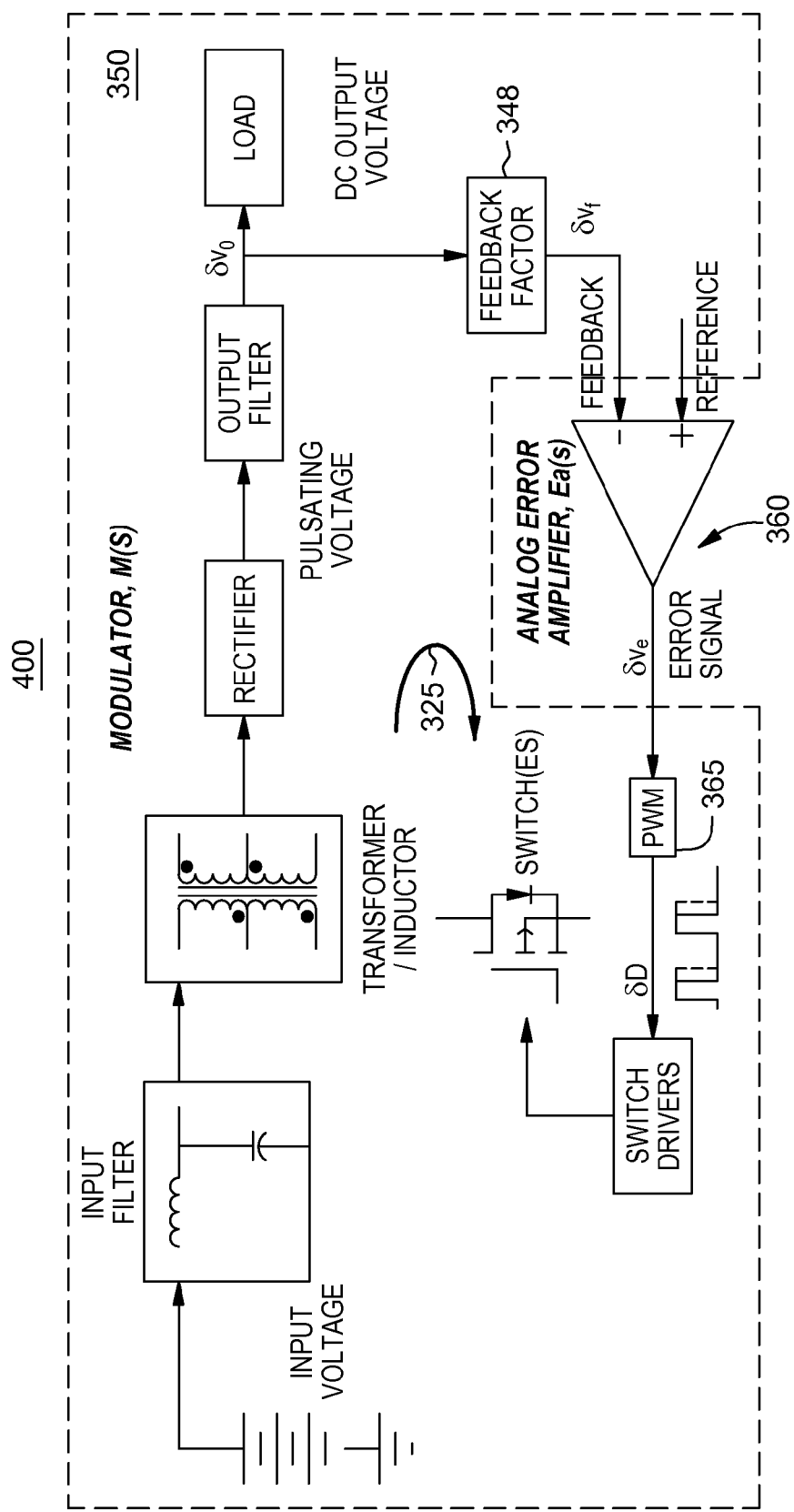
FIG. 9 which shows an embodiment of an analog converter loop 400 exemplifying modulator gain and phase used in the regulation of an output voltage for a switch-mode DC/DC power converter from which digital filter transfer functions are derivable.

To identify and program each of the digital filters 160, 161, reference is now had too FIG. 9 which shows a corresponding counterpart DC/DC power converter 400 implementing an analog error amplifier in the regulation of one or more outputs for a switch-mode DC/DC power converter.

As shown in FIG. 9, identifying and formulating the corresponding analog error amplifier 360 includes partitioning a power converter's single output converter loop 325 into two parts, such as shown in the representation of the circuit 400, in which a first Modulator block 350 and a remaining analog error amplifier block 360.

Within the Modulator 350 the PWM block 365 has, when slightly perturbed, a gain $F_m$, where $F_m = \delta D/\delta v_e$, that is, it is equal to the ratio between duty cycle change ($\delta D$) and error signal variation ($\delta v_e$). There is further derived the power stage gain $G_{vd}(s) = \delta v_o/\delta D$, as function of the perturbation frequency. The feedback factor 348 has a simple gain $K_f = \delta v_f/\delta v_o$ where $\delta v_f/\delta v_o$ is a ratio between feedback changes and output changes. The Modulator has a gain equal to $M(s) = K_f G_{vd}(s) F_m$. Depending on converter topology, and the PWM mechanism 365, a gain of individual block changes both in mathematical form and in value.

Figure 10A:
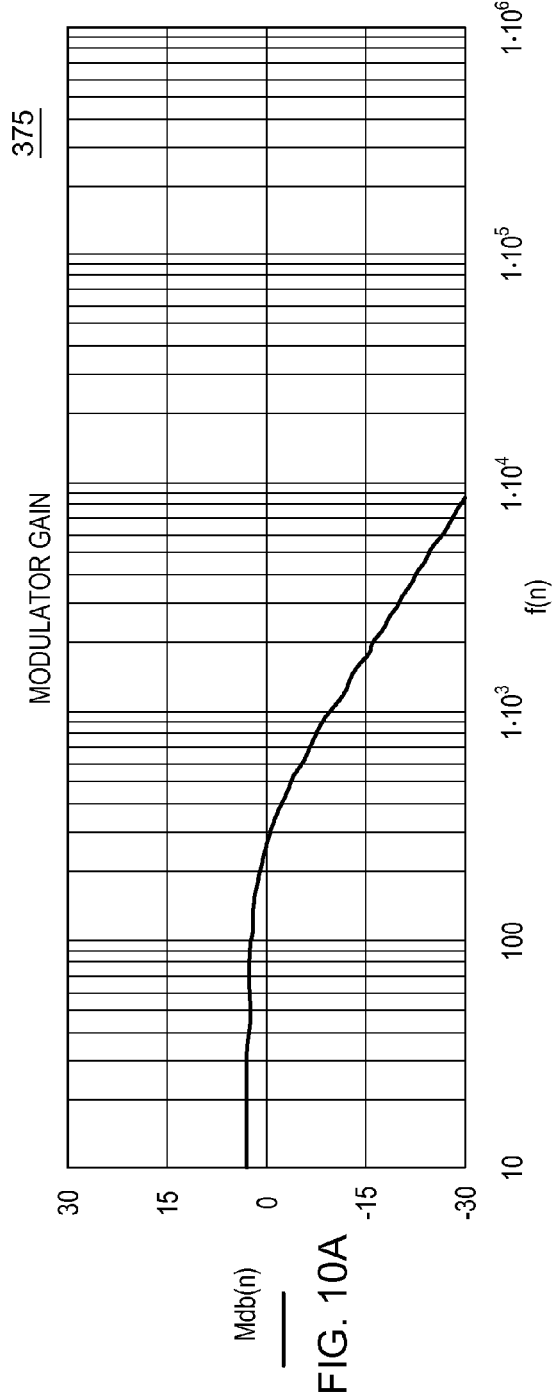
FIG. 10A shows a graphic plot 375 of the modulator gain M(s) as a function of frequency for an exemplary analog converter of FIG. 9.
Figure 10B:
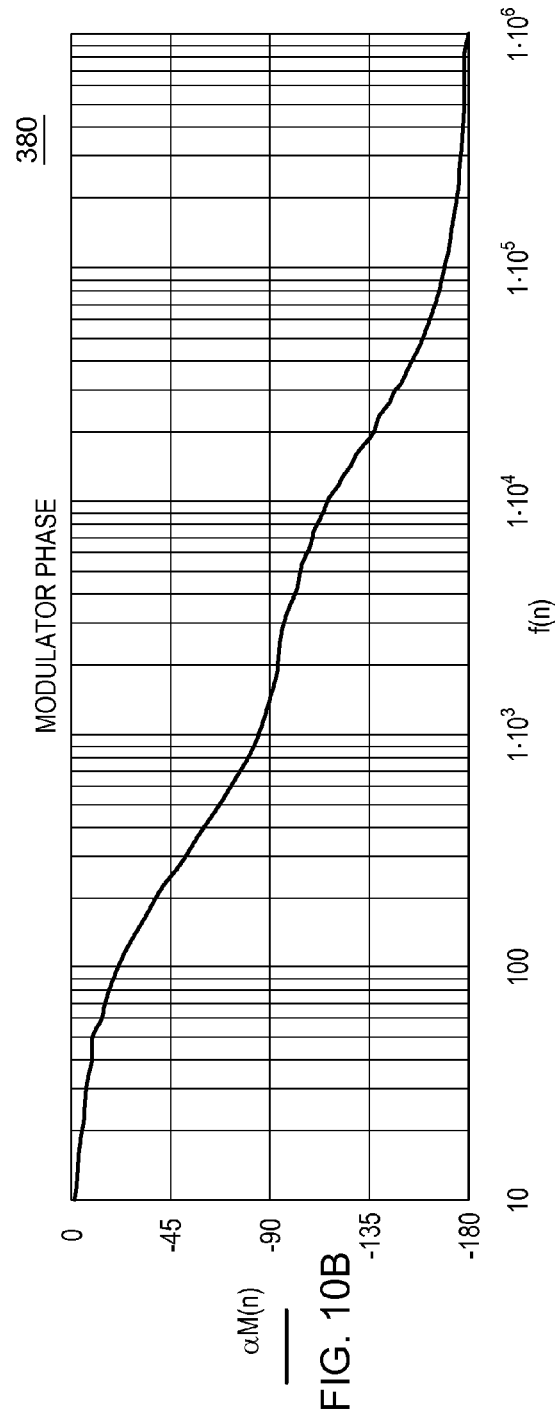
FIG. 10B presents a graphic plot 380 of the modulator phase for the exemplary analog converter of FIG. 9.

FIG. 10A shows a graphic plot 375 of the modulator gain M(s) as a function of frequency for an exemplary analog converter of FIG. 9; and FIG. 10B presents a graphic plot 380 of the modulator phase for the exemplary analog converter of FIG. 9.

Thus, given an example desired closed-loop unity-gain crossover frequency, for example, selected at 2 KHz, FIG. 10A shows a plot indicating at an example frequency of 2 KHz, a modulator configured gain of −16 db and a phase of −94°. Next, for system stability, the phase of the control loop gain at the selected frequency, e.g., 2 KHz, is in general assigned a positive margin from 30° to 60°. It is these four critical numbers (i.e., crossover frequency, modulator gain, modulator phase, and loop gain phase margin) that lead to a Type-II analogue error amplifier transfer function:

$$E_{a1}(s) = -\frac{(as+1)}{bs(cs+1)},$$

or
a Type-III analogue error amplifier transfer function:

$$E_{a2}(s) = -\frac{(as+1)^2}{bs(cs+1)^2},$$

with each transfer function $E_{a1}(s)$ and $E_{a2}(s)$ having respective sets of polynomial coefficients, e.g., coefficients a, b, and c, in accordance with analog filter components used to attain a selected crossover frequency, modulator gain, modulator phase, and loop gain phase margins.

With the Type-II analog error amplifier's and/or Type-III analog error amplifier's transfer function identified and expressed in standard compact, close form, a bi-linear transform $s = C(1-z^{-1})/(1+z^{-1})$, is applied to each in an additional mathematical transformation. The step relates the continuous analog error amplifier, symbolized by the Laplace operator s, to the discrete digital filter, symbolized by the sampling operator z, to obtain corresponding $H_1(z)$ and $H_2(z)$ forms having $a_n$ and $b_n$ coefficients indicated. It shall be noted that the minus sign shown in the analog $E_a(s)$ functions are omitted for the digital H(z) functions.

That is, in the embodiments described herein, the discrete digital filter $H_1(z)$ transfer function having a Type-II form is derived from the first error analog error amplifier transfer function $E_{a1}(s)$, and the discrete digital filter $H_2(z)$ transfer function having a Type-III form is derived the second analogue error amplifier transfer function $E_{a2}(s)$, where in each, digital filter coefficients $a_n$ and $b_n$ values relate to combination of analog coefficients a, b, and c that are attributed to combinations of physical components: resistors and capacitors, corresponding to aforementioned Type-II and Type-III filter forms.

Example

A flyback converter for an assembly used in the telecommunications market for powering less than 100 W applications implements digital control. FIG. 11 circuit simulation shows the merging of both digital filters, $H_1(z)$ of FIGS. 8A and $H_2(z)$ of FIG. 8B, and controlling the dwell time in either, both $v_1$ and $v_2$, both output loads are regulated simultaneously. FIG. 11 shows an example application for a flyback converter 450 with two outputs provided and designed for $v_1$=3.3V/15 A and $v_2$=12V/0.2 A, and use of a single controller device implementing each digital filter. As shown, the analog feedback is taken from both $v_1$ and $v_2$. The expected performance is confirmed by the corresponding MATLAB SIMULINK simulation, FIG. 12.

Here, in the digital control circuit simulation depicted FIG. 11, from a 24V input 12, the circuit 450 generates two simulated output loads: a first at 3.3 volts, and a second output at 12 volts. The 3.3V output is loaded at 15 Amperes, 0.22 Ohm, element designator RL, while 12V at 0.2 Amperes, 60 Ohm, element designator RL1. The power switch, element designator MOSFET 505, operates at 20 KHz; which is commanded by a triangular clock generated in the block identified as "subsystem" with "connection port" 69.

For the 3.3V loop, with feedback $R_{f3}$ and $R_{f4}$, the type-II digital filter identified as $H_3(Z)$ has a first set of coefficients:

$$H_3(z) = \frac{a_0 + a_1 z^{-1} + a_2 z^{-2}}{1 + b_1 z^{-1} + b_2 z^{-2}}$$

and for the 12V loop, with feedback $R_{f1}$ and $R_{f2}$, the type-II digital filter identified as Hz12 has a different set of coefficients:

$$H_{12}(z) = \frac{a_3 + a_4 z^{-1} + a_5 z^{-2}}{1 + b_3 z^{-1} + b_4 z^{-2}}$$

where $a_0 \neq a_3$, $a_1 \neq a_4$, and $a_2 \neq a_5$ and $b_1 \neq b_3$ and $b_2 \neq b_4$.

In the simulation of FIG. 11 it shows a pulse generator 68 following the two digital filters. The pulse generator runs in a selected, high rate with a preset duty cycle. During a "high-output" state, digital filter $H_3(z)$ is in control of the loop. During a "Low-output" state, $H_{12}(z)$ instead takes over. By adjusting both the pulse rate and the High/Low duty cycle, both $v_1$ and $v_2$ yield better output level than what the single digital filter loop offers.

Figure 12:
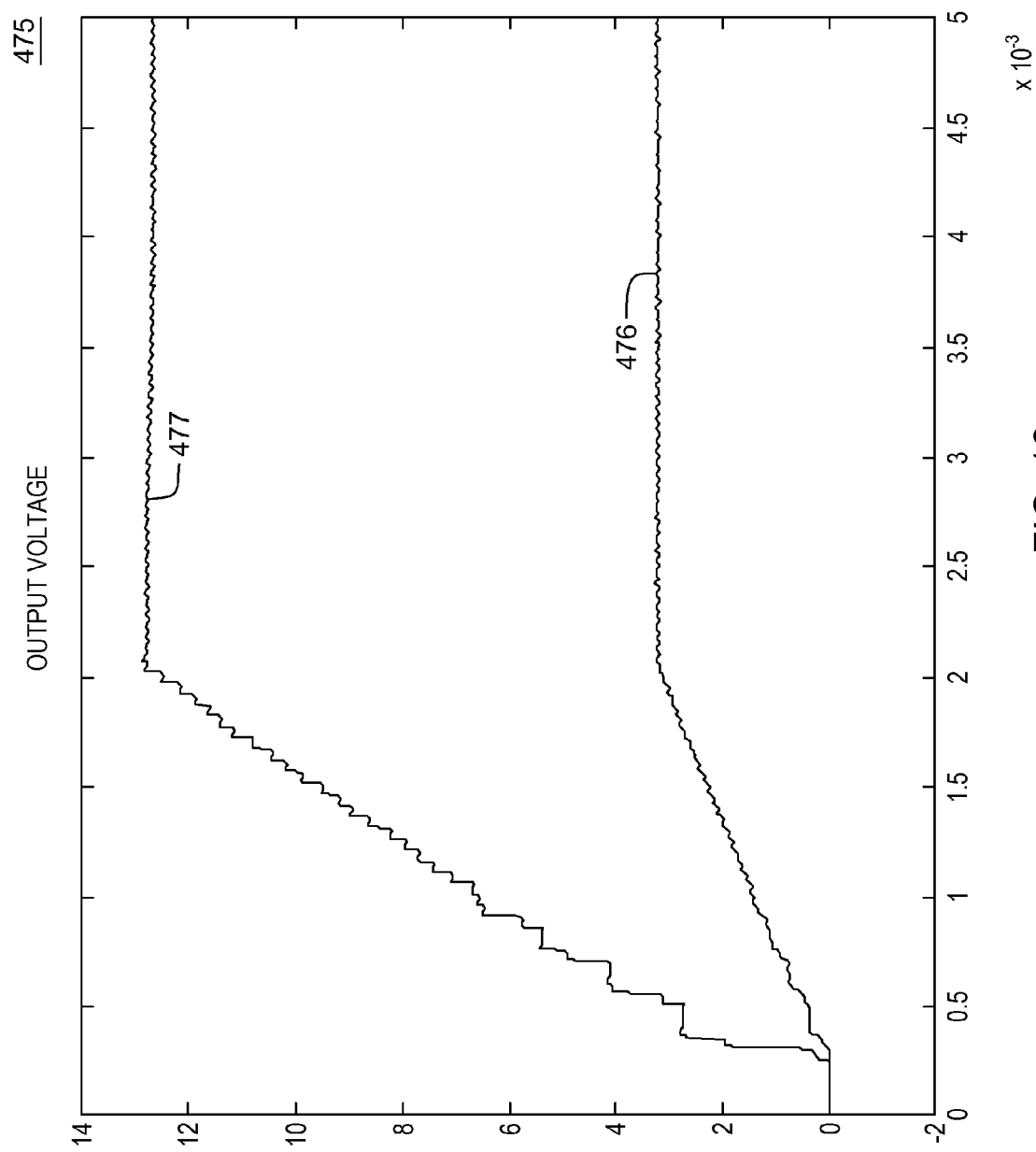
FIG. 12 shows a resulting graph of simulation results corresponding to outputs take from the simulation of FIG. 11.

FIG. 12 shows example simulation results 475 corresponding to the simulation of FIG. 11 with a first plot 476 that clearly indicates the digitally regulated output $v_1$ near 3.3V and a second plot 477 showing the simultaneously digitally regulated output $v_2$ at about 12.6V.

The example results shown in FIG. 12 show that by varying the dwell ratio, for example 50%(12V)/50%(3.3V) or 45%(12V)/55%(3.3V), regulation is shared, partitioned, or allocated at will or as desired. Compared with existing single loop converter performance, this approach uniquely offers coexisting, multiple digital loops that enable multi-output regulation.

Furthermore, in one embodiment, a DC/DC converter device employing digital filter control in the manner as set forth herein, may be programmable remotely, e.g., over a wired or wireless communication link(s). For example, the above filter programming tasks may be performed remotely via a network, such as the Internet.

Figure 13:
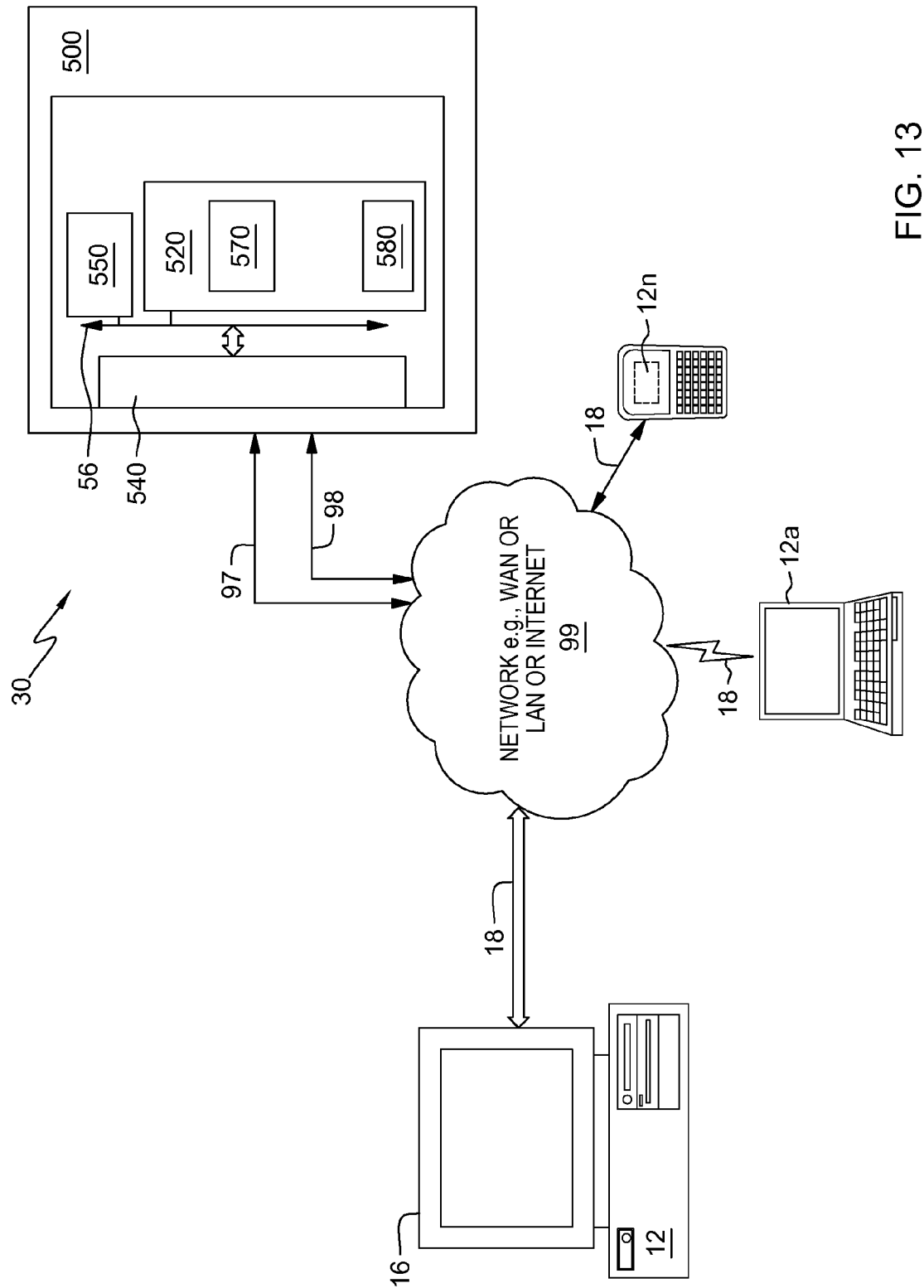
FIG. 13 shows a further embodiment of a system that provides external control of the DC/DC flyback converter of FIGS. 4, 5A and 5B.

FIG. 13 shows an example embodiment of the DC/DC converter device 500 being programmed via controls entered via a device interface itself (not shown), or programmed remotely, such as by computing device 12, e.g., via a display 16 or line command interface. Alternatively, via a remotely located device (e.g., a mobile device 12a running an application, or via a personal digital assistant, or smart phone device 12n), the DC/DC converter device 500 may be programmed over a network 99 such as the Internet.

Thus, DC/DC converter 500 apparatus includes the controller 550, e.g., an FPGA or microprocessor, etc., having at least a memory storage device 520, e.g., registers 570, main memory and/or a cache 580, with the controller device 550 coupled to the memory, e.g., via conductors such as a data and address bus 56, wherein the processor device 550 is configured to access sets of coefficients from a staging memory or buffer registers 570 to configure itself as a digital filter 160, 161 or 162 according to the embodiments as described herein. In one aspect, the associated memory storage device 520 receives and stores program instructions including the functions and procedures that are accessed by the hardware processor device 550 for configuring the filters and partitioning the digital control dwell times thereof. The partitioning of control resources may be in response to operating conditions detected by the DC/DC converter device itself.

In such an embodiment, the DC/DC converter 500 is equipped with a communications transceiver providing an interface 540 configured to receive signals communicated over a communications link 18 for programming the DC/DC converter digital filter(s). For example, as shown in FIG. 13, signals 18 are received having the $a_n$ and $b_n$ coefficient value sets 97, 98 for configuring each of the discrete digital domain transfer function forms H(z) in real-time.

In operation, microprocessor, microcontroller or field programmable gate array (FPGA) 550 coupled to the memory 520 accesses the stored values to program the converter to configure each discrete digital filter according to any of the embodiments described herein. Thus, from a remote location, such as a wireless or wired communication link, the polynomial coefficient values, e.g., two sets 97, 98 of coefficients ($a_n$ and $b_n$) for either of the Type-II or Type-III discrete digital filter transfer functions.

The present invention thus provides a simpler, lower cost circuit alternative for enhancing, by digital control, such switched DC/DC voltage power supplies.

The present invention may be a system, a method, and/or a computer program product. The computer program product may include a computer readable storage medium (or media) having computer readable program instructions thereon for causing the controller device 550 of FIG. 13, to carry out digital filtering aspects of the present invention.

While various embodiments are described herein, it will be appreciated from the specification that various combinations of elements, variations or improvements therein may be made by those skilled in the art, and are within the scope of the invention. In addition, many modifications may be made to adapt a particular combination of devices to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A multi-loop switch-mode DC/DC power flyback converter for simultaneously regulating multiple outputs, in steady-state, with switched digital filters comprising:
   a time-shared, common power transformer and drive circuit receiving a source of DC power, and providing a regulated power output to both a first output load and a second output load;
   a first feedback loop associated with the first output load for regulating said power supplied to said first output load, and a second feedback loop associated with the second output load for regulating said power supplied to said second output load;

a first digital filter for processing a first feedback signal corresponding to the first output load in said first feedback loop and generating a first error signal;

a second digital filter for processing a second feedback signal corresponding to the second output load in said second feedback loop and generating a second error signal, said first and second digital filters being derived from a respective corresponding analog transfer gain function, wherein said first and second digital filters for the respective first and second feedback loop are a direct form implementation of a discrete digital filter transfer function having one of: a quadratic or cubic denominator;

a switching device for distributing the first error signal generated from the first digital filter as an output at first time intervals, and distributing said second error signal generated from the second digital filter as an output at second time intervals;

said time-shared, common power transformer and drive circuit responsive to said first output error signal for simultaneously regulating said first output load in steady-state at said first time intervals, and responsive to said second output error signal for simultaneously regulating said second output load in steady-state at said second time intervals, wherein each said first and second digital filter are individually configured to perform its own regulation, and each said first digital filter and second digital filter of the discrete digital filter transfer function having polynomial coefficients that are configured to be instantly switched among quadratic, cubic, or higher order polynomial forms.

2. The switch-mode DC/DC power flyback converter of claim 1, further comprising:

a single switch driver circuit, said single switch driver circuit receiving said first output error signal during said first and successive first time intervals for controlling said time-shared, common power transformer at each said first and successive first time intervals, and said single switch driver circuit receiving said second error signal during said second and successive second time intervals for controlling said time-shared, common power transformer at each said second and successive second time intervals.

3. The switch-mode DC/DC power flyback converter of claim 2, further comprising:

a pulse width modulator (PWM) device, said pulse width modulator device receiving said first error signal in a first time interval and comparing said received first error signal against a reference signal during said first time interval, said PWM generating a first signal responsive to said comparison for receipt by said single switch driver circuit for controlling said time-shared, common power transformer in the first time intervals;

said pulse width modulator device further receiving said second error signal in a second time interval and comparing said received second error signal against a reference signal during said second time interval, said PWM generating a second signal responsive to said comparison for receipt by said single switch driver circuit for controlling said time-shared, common power transformer in the second time intervals.

4. The switch-mode DC/DC power flyback converter of claim 3, wherein said reference signal is a periodic ramped signal.

5. The switch-mode DC/DC power flyback converter of claim 1, further comprising:

a pulse signal generator for generating a signal for input to said switching device for controlling said switching device to distribute said first digital filter output error signals and second digital filter output error signals at respective first time and second time intervals.

6. The switch-mode DC/DC power flyback converter of claim 5, wherein said signal generator comprises a clock device, said clock device configured at a duty cycle for setting a corresponding first time interval and second time interval.

7. The switch-mode DC/DC power flyback converter of claim 5, wherein said switching device comprises a single-pole double-throw (SPDT) switch responsive to said generated signal to either distribute the first error signal at said first time interval, or distribute the second error signal at said second time interval.

8. The switch-mode DC/DC power flyback converter of claim 1, wherein the digital filter transfer function having said quadratic polynomial denominator is of a form H(z) where:

$$H(z) = \frac{a_0 + a_1 z^{-1} + a_2 z^{-2}}{1 + b_1 z^{-1} + b_2 z^{-2}}$$

where $a_n$ and $b_n$, n=0, 1 or 2 are polynomial coefficients, and $z^{-1}$ represents a unit time delay.

9. The switch-mode DC/DC power flyback converter as claimed in claim 1, wherein the digital filter transfer function having said cubic polynomial denominator is of a form H(z) where:

$$H(z) = \frac{a_0 + a_1 z^{-1} + a_2 z^{-2} + a_3 z^{-3}}{1 + b_1 z^{-1} + b_2 z^{-2} + b_3 z^{-3}}$$

where $a_n$ and $b_n$, n=0, 1, 2 or 3 are polynomial coefficients.

10. A method for simultaneously regulating multiple outputs, in steady-state, of a multi-loop switch-mode DC/DC power converter with switched digital filters, said method comprising:

receiving, at a time-shared, common power transformer and drive circuit a source of DC power, said time-shared, common power transformer converting said DC power source to a respective regulated power output at both a first output load and a second output load;

receiving, at a first digital filter device in a first feedback loop associated with said first output load, a first feedback signal; and receiving, at a second digital filter device in a second feedback loop associated with said second output load, a second feedback signal, said first and second digital filter devices being derived from a respective corresponding analog transfer gain function, wherein first and second digital filters for the respective first and second feedback loop are a direct form implementation of a discrete digital filter transfer function having one of: a quadratic or cubic denominator;

generating, at an output of said first digital filter, a first error signal based on said received first feedback signal, and generating, at an output of said second digital filter, a second error signal based on said received second feedback signal, distributing, using a switching device, the first error signal generated from the first digital filter as an output at first time intervals, and distributing, using the switching device, said second error signal generated from the second digital filter as an output at second time intervals;

simultaneously regulating, responsive to said first output error signal, said first output load at said first time intervals, and regulating, responsive to said second output error signal, said second output load at said second time intervals, wherein each said first digital filter or second digital filter are individually configured to perform its own regulation, and each said first digital filter and second digital filter of the discrete digital filter transfer function having polynomial coefficients that are configured to be instantly switched among quadratic, cubic, or higher order polynomial forms.

11. The method of claim 10, wherein said regulating responsive to both said first and second output error signal comprises:

receiving, at a single switch driver circuit, said first output error signal during said first and successive first time intervals for controlling said time-shared, common power transformer at each said first and successive first time intervals, and receiving, at said single switch driver circuit, said second error signal during said second and successive second time intervals for controlling said time-shared, common power transformer at each said second and successive second time intervals.

12. The method of claim 11, wherein said regulating responsive to both said first and second output error signal comprises:

receiving, at a pulse width modulator (PWM) device, said first error signal in a first time interval and comparing said received first error signal against a periodic ramped signal at said first time interval, said PWM generating a first signal responsive to said comparison for receipt by a single switch driver circuit for controlling said time-shared, common power transformer in the first time intervals; and receiving, at the pulse width modulator device, said second error signal in a second time interval and comparing said received second error signal against a periodic ramped signal at said second time interval, said PWM generating a second signal responsive to said comparison for receipt by the single switch driver circuit for controlling said time-shared, common power transformer in the second time intervals.

13. The method of claim 10, further comprising:

generating a signal, using a signal generator, for input to said switching device for controlling said switching device to distribute said first error signals and second error signals as outputs at respective first time and second time intervals, wherein said signal generator comprises a clock device configured at a duty cycle for setting a corresponding first time interval and second time interval.

14. The method of claim 13, wherein said switching device comprises a Single-pole Double-throw (SPDT) switch responsive to said generated signal to either distribute the first output error signal at said first time interval, or distribute the second output error signal at said second time interval.

15. The method of claim 10, wherein the digital filter transfer function having said quadratic polynomial denominator is of a form H(z) where:

$$H(z) = \frac{a_0 + a_1 z^{-1} + a_2 z^{-2}}{1 + b_1 z^{-1} + b_2 z^{-2}}$$

where $a_n$ and $b_n$, n=0, 1 or 2 are polynomial coefficients, and $z^{-1}$ stands for a unit time delay.

16. A multi-loop switch-mode DC/DC power flyback converter for simultaneously regulating multiple outputs, in steady-state, with switched digital filters comprising:

a time-shared, common power transformer and drive circuit receiving a source of DC power, and providing a regulated power output to both a first output load and a second output load;

a first feedback loop associated with the first output load for regulating said power supplied to said first output load, and a second feedback loop associated with the second output load for regulating said power supplied to said second output load;

a first digital filter for processing a first feedback signal corresponding to the first output load in said first feedback loop and generating a first error signal;

a second digital filter for processing a second feedback signal corresponding to the second output load in said second feedback loop and generating a second error signal, said first and second digital filters being derived from a respective corresponding analog transfer gain function, wherein first and second digital filters for the respective first and second feedback loop are a direct form implementation of a discrete digital filter transfer function having one of: a quadratic or cubic denominator;

said single controller device being configurable as said first digital filter for the first feedback loop and said second digital filter for a second feedback loop, said single controller device receiving a first set of coefficients to configure a direct form implementation of a first discrete digital filter during a first time interval and successive time intervals, and said single controller device receiving a second set of coefficients to configure a direct form implementation of a discrete second digital filter during the second time interval and successive second time intervals;

said controller device generating a first error signal output when configured as the first digital filter at first time intervals, and generating a second error signal output when configured as the second digital filter at said second time intervals; and said time-shared, common power transformer and drive circuit responsive to said first output error signal for regulating said first output load in steady-state at said first time intervals, and responsive to said second output error signal for simultaneously regulating said second output load in steady-state at said second time intervals, wherein each said first and second digital filter are individually configured to perform its own regulation, and each said first digital filter and second digital filter of the discrete digital filter transfer function having polynomial coefficients that are configured to be instantly switched among quadratic, cubic, or higher order polynomial forms.

17. The switch-mode DC/DC power flyback converter of claim 16, wherein the digital filter transfer function having said quadratic polynomial denominator is of a form H(z) where:

$$H(z) = \frac{a_0 + a_1 z^{-1} + a_2 z^{-2}}{1 + b_1 z^{-1} + b_2 z^{-2}}$$

where $a_n$ and $b_n$, n=0, 1 or 2 are polynomial coefficients, and $z^{-1}$ represents a unit time delay.

18. A method for simultaneously regulating multiple outputs, in steady-state, of a multi-loop switch-mode DC/DC power converter with switched digital filters, said method comprising:

receiving, at a time-shared, common power transformer and drive circuit a source of DC power, said time-shared, common power transformer converting said DC power source to a respective regulated power output at both a first output load and a second output load;

configuring a controller device as a first digital filter in a first feedback loop in a first time interval and configuring said controller device as a second digital filter for a second feedback loop in a second time interval, said first and second digital filter devices being derived from a respective corresponding analog transfer gain function, wherein first and second digital filters for the respective first and second feedback loop are a direct form implementation of a discrete digital filter transfer function having one of: a quadratic or cubic denominator;

receiving, at a controller device, a first set of coefficients to configure a direct form implementation of a first discrete digital filter during a first time interval and successive time intervals, and receiving at said controller device a second set of coefficients to configure a direct form implementation of a discrete second digital filter during the second time interval and successive second time intervals;

said controller device generating a first error signal output when configured as the first digital filter at first time intervals, and generating a second error signal output when configured as the second digital filter at said second time intervals; and simultaneously regulating, responsive to said first output error signal, said first output load at said first time intervals, and regulating, responsive to said second output error signal, said second output load at said second time intervals, wherein each said first digital filter or second digital filter are individually configured to perform its own regulation, and each said first digital filter and second digital filter of the discrete digital filter transfer function having polynomial coefficients that are configured to be instantly switched among quadratic, cubic, or higher order polynomial forms.

19. The method of claim 18, wherein the digital filter transfer function having said quadratic polynomial denominator is of a form H(z) where:

$$H(z) = \frac{a_0 + a_1 z^{-1} + a_2 z^{-2}}{1 + b_1 z^{-1} + b_2 z^{-2}}$$

where $a_n$ and $b_n$, n=0, 1 or 2 are polynomial coefficients, and $z^{-1}$ stands for a unit time delay.

* * * * *